United States Patent [19]

Breneman et al.

[11] Patent Number: 4,826,668

[45] Date of Patent: May 2, 1989

[54] PROCESS FOR THE PRODUCTION OF ULTRA HIGH PURITY POLYCRYSTALLINE SILICON

[75] Inventors: William C. Breneman, Sistersville, W. Va.; Robert N. Flagella, Ridgefield, Wash.; James M. Gaston, Vancouver, Wash.; David W. Hagan, Vancouver, Wash.

[73] Assignee: Union Carbide Corporation, Danbury, Conn.

[21] Appl. No.: 62,256

[22] Filed: Jun. 11, 1987

[51] Int. Cl.⁴ ............................................. C01B 33/02
[52] U.S. Cl. ................................. 423/349; 156/611; 156/612; 156/613; 156/DIG. 64; 156/DIG. 98; 422/245; 422/246
[58] Field of Search .................. 423/347, 349–350, 423/348; 156/612, 613, DIG. 64, DIG. 73, DIG. 88, DIG. 89, DIG. 98, DIG. 112, 611; 422/245–246; 118/715, 719; 427/252, 255

[56] References Cited

U.S. PATENT DOCUMENTS

| | | | |
|---|---|---|---|
| 3,112,997 | 12/1963 | Benzing et al. | 423/349 |
| 3,286,685 | 11/1966 | Sandman et al. | 423/349 |
| 4,147,814 | 4/1979 | Yatsurugi et al. | 423/349 |
| 4,150,168 | 4/1979 | Yatsurugi et al. | 423/349 |
| 4,170,667 | 10/1979 | Rodgers | 423/349 |
| 4,237,151 | 12/1980 | Strongin et al. | 423/349 |
| 4,343,772 | 8/1982 | Levin et al. | 422/200 |
| 4,464,222 | 8/1984 | Gutsche | 156/DIG. 89 |
| 4,632,058 | 12/1986 | Dixon et al. | 156/613 |
| 4,668,493 | 5/1987 | Levin | 156/DIG. 64 |
| 4,684,513 | 8/1987 | Iya | 423/349 |

FOREIGN PATENT DOCUMENTS 4431717 3/1967 Japan.

Primary Examiner—William R. Dixon, Jr.
Assistant Examiner—Andrew Griffis
Attorney, Agent, or Firm—Morris N. Reinisch

[57] ABSTRACT

The present invention is directed to an improved process for producing ultra high purity polycrystalline silicon which process provides for increased production capacity and electrical power efficiency. The process comprises recycling the exhaust gases of the silane pyrolysis reactor after the gases have been preferably first cooled and filtered utilizing a pocket-type reaction zone enclosure having a particular effective radius thereby effectively decreasing the amount of silicon powder formation. Preferably, the rate of recycle flow is sufficient to entrain silicon powder in the reactor and remove the powder from the reactor with the exiting exhaust gases.

30 Claims, 20 Drawing Sheets

POWDER FORMATION VOLUME VS POCKET RADIUS

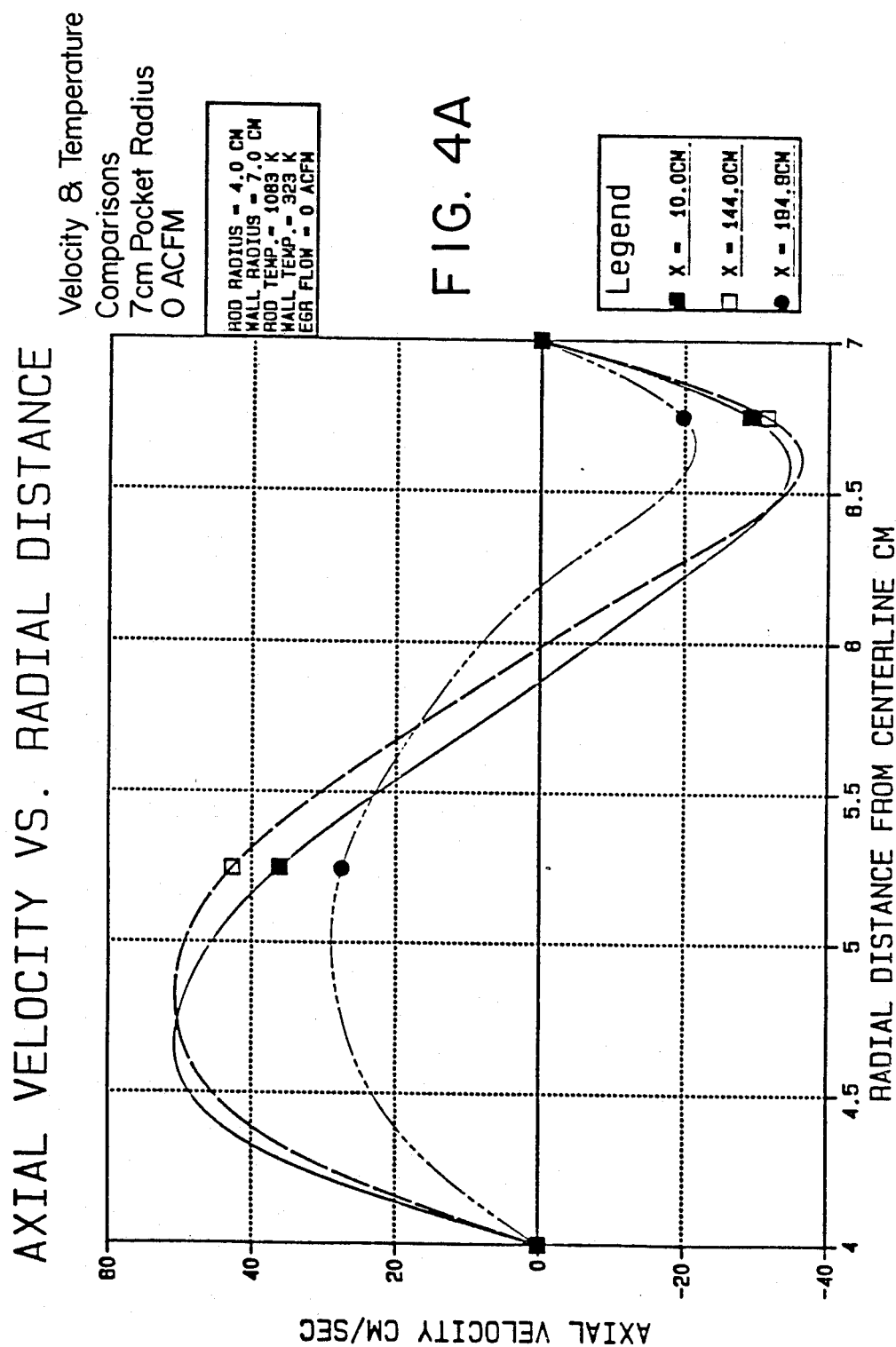

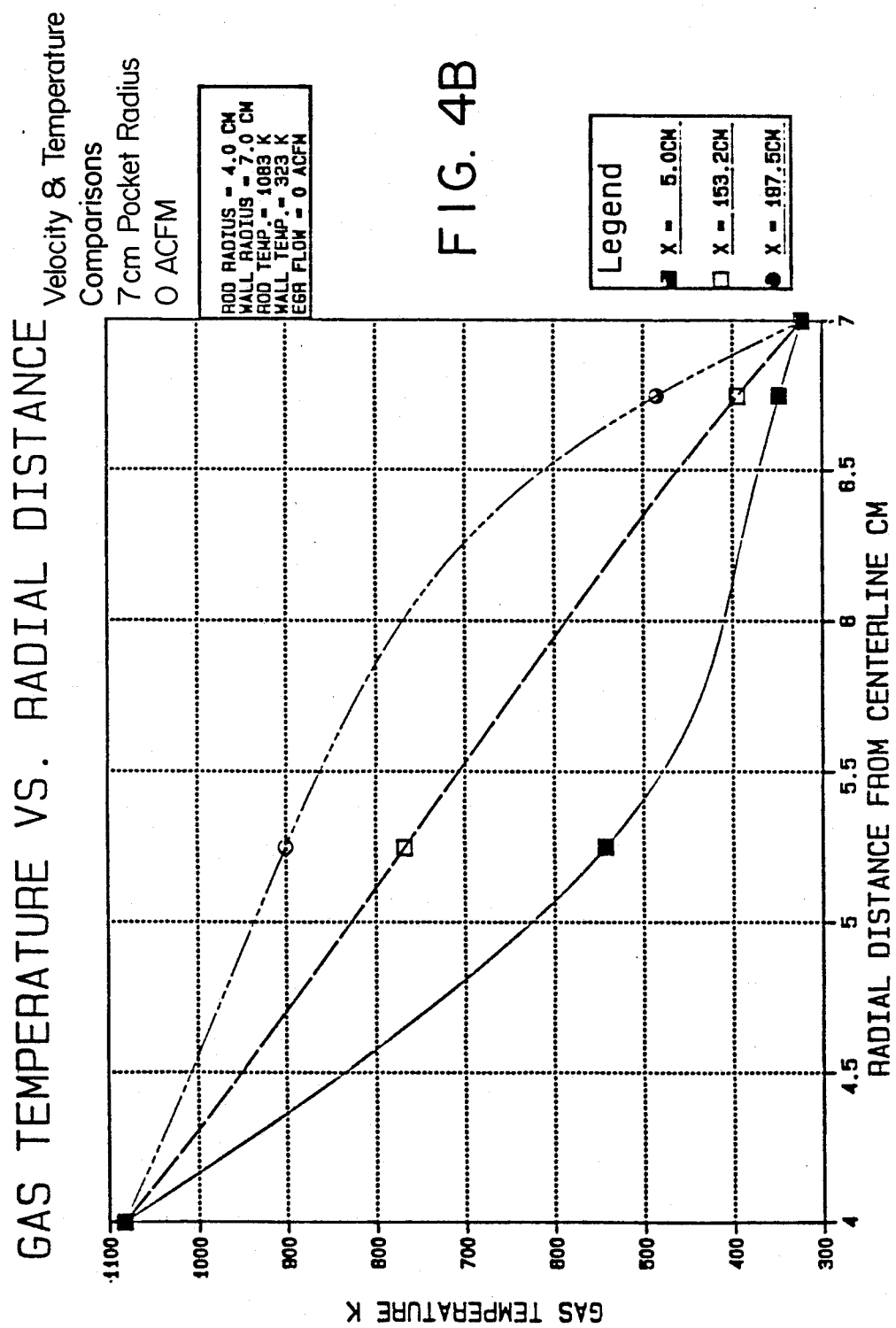

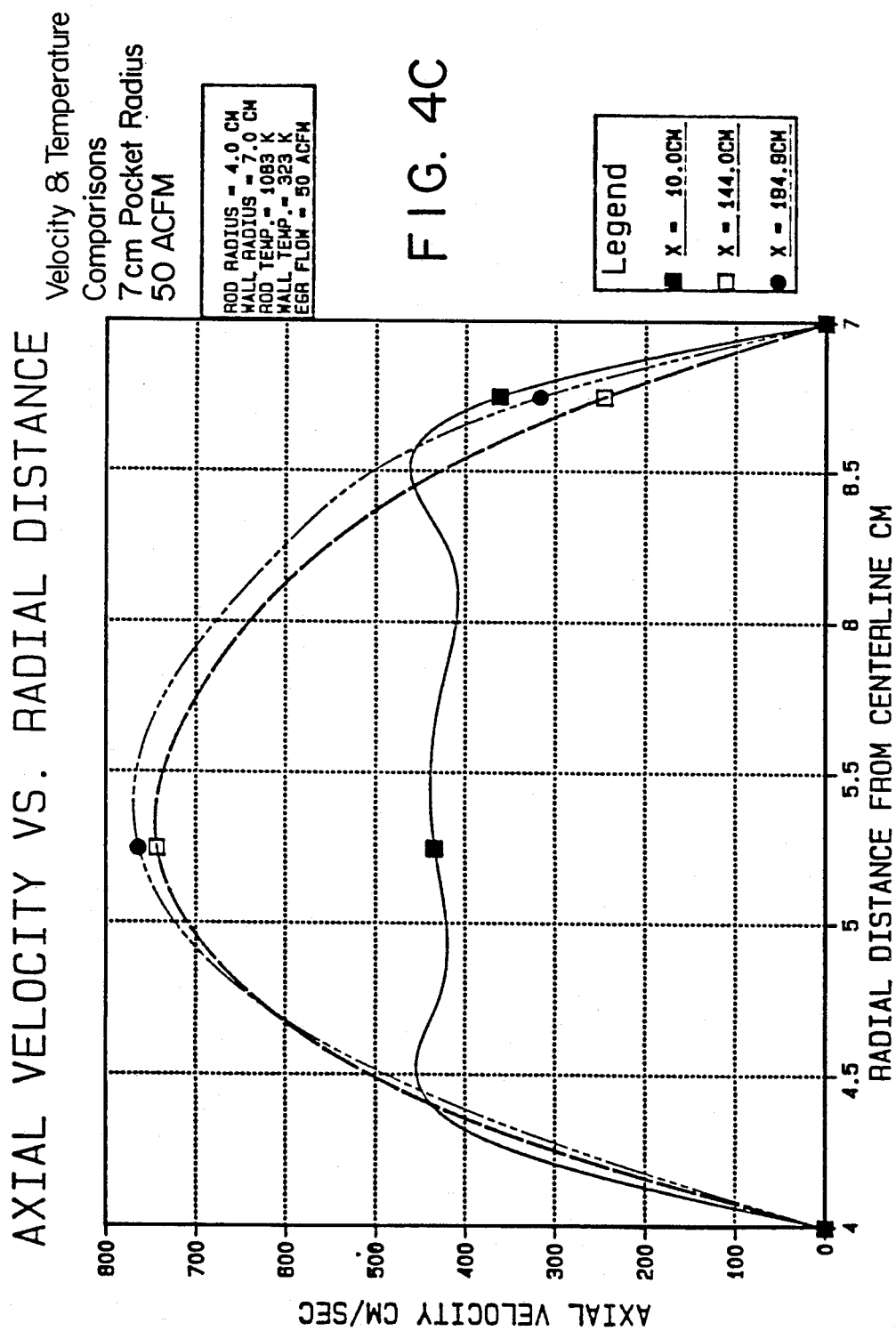

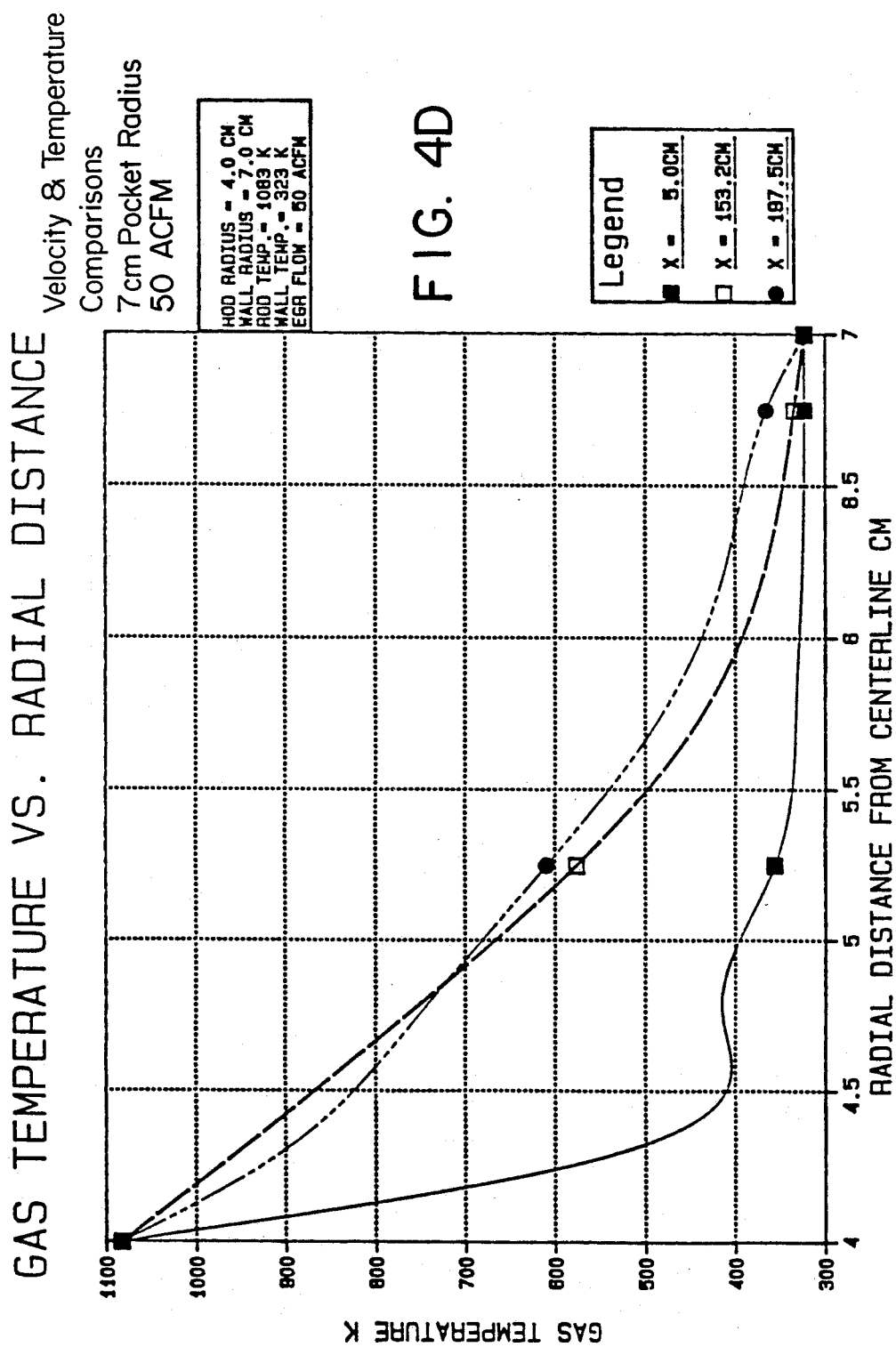

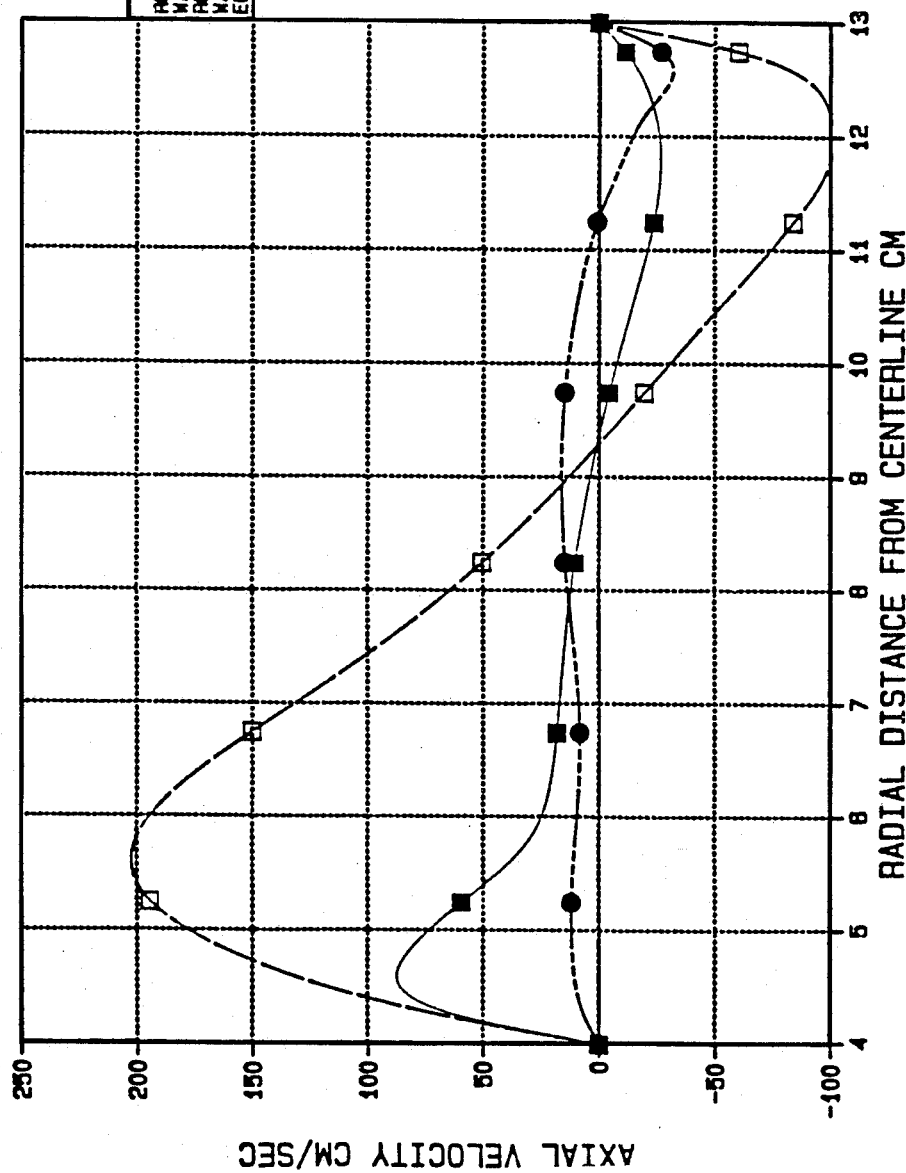

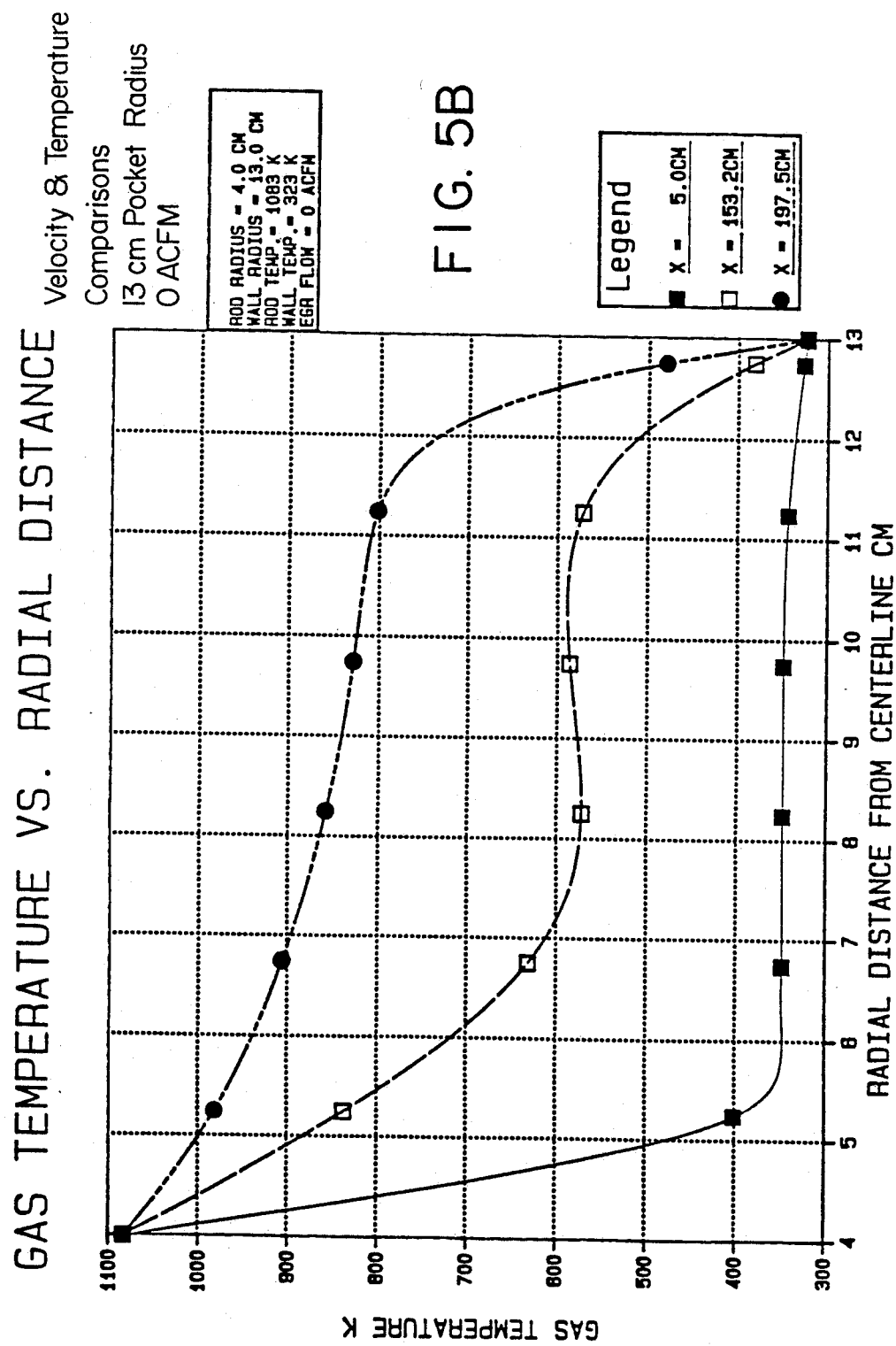

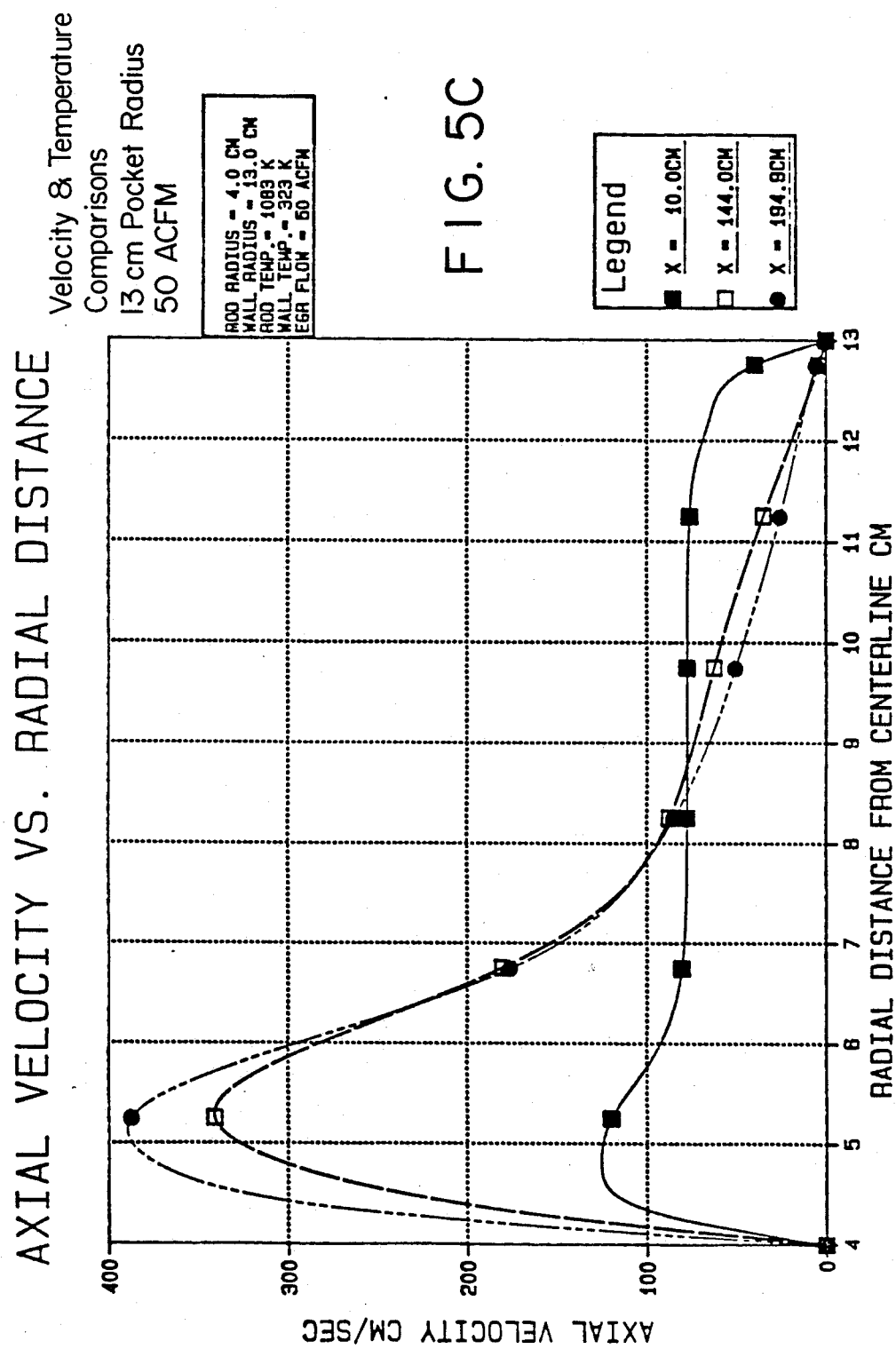

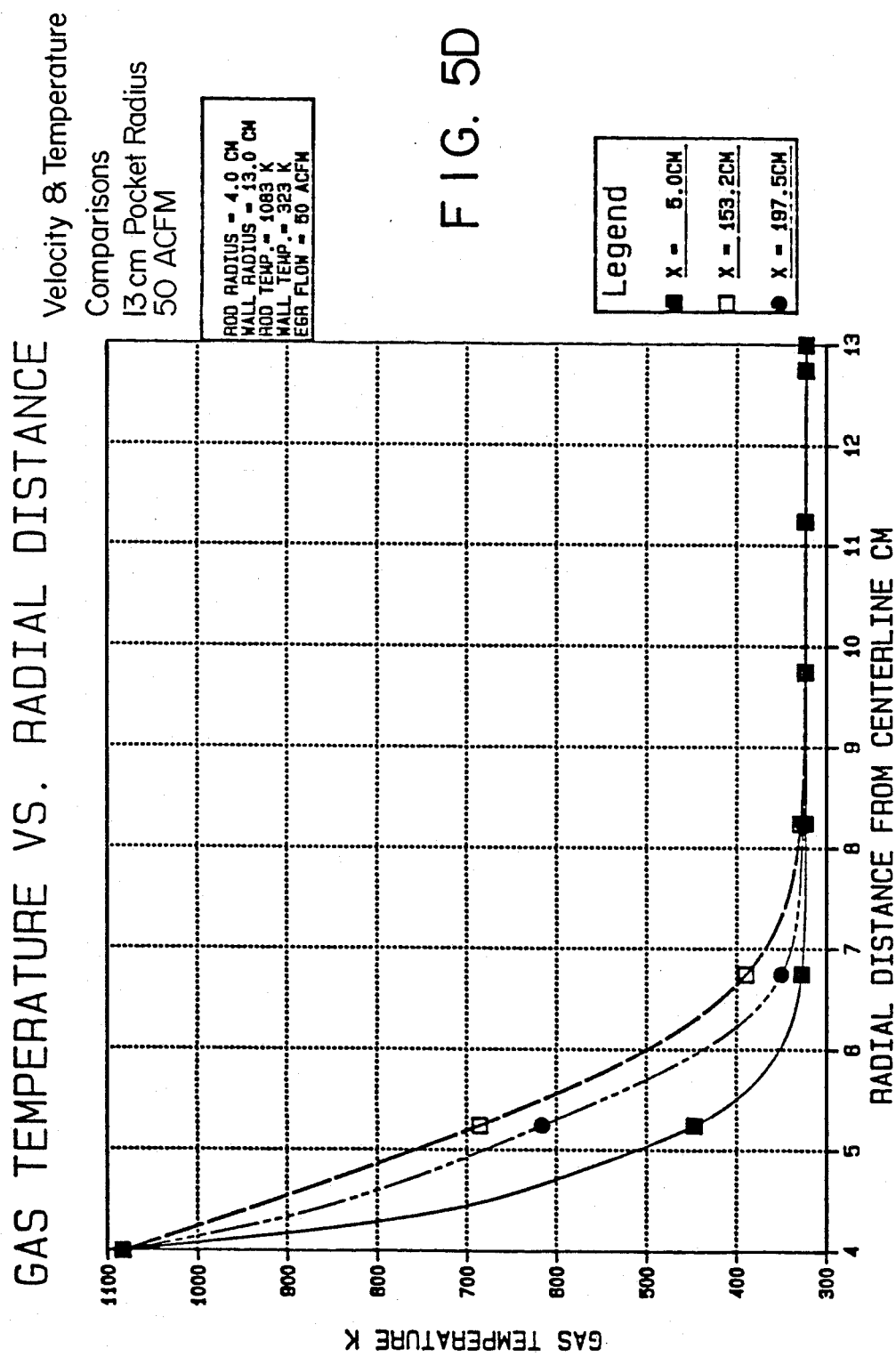

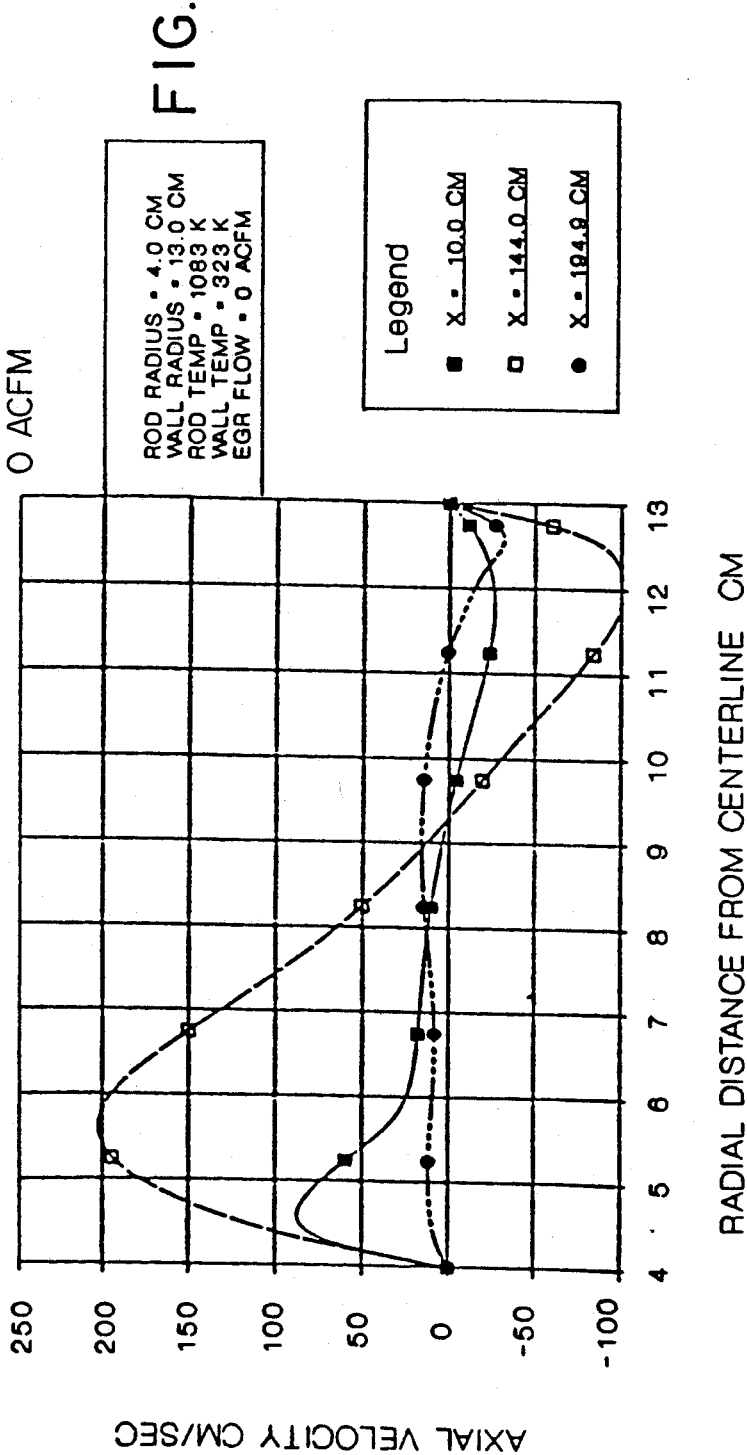

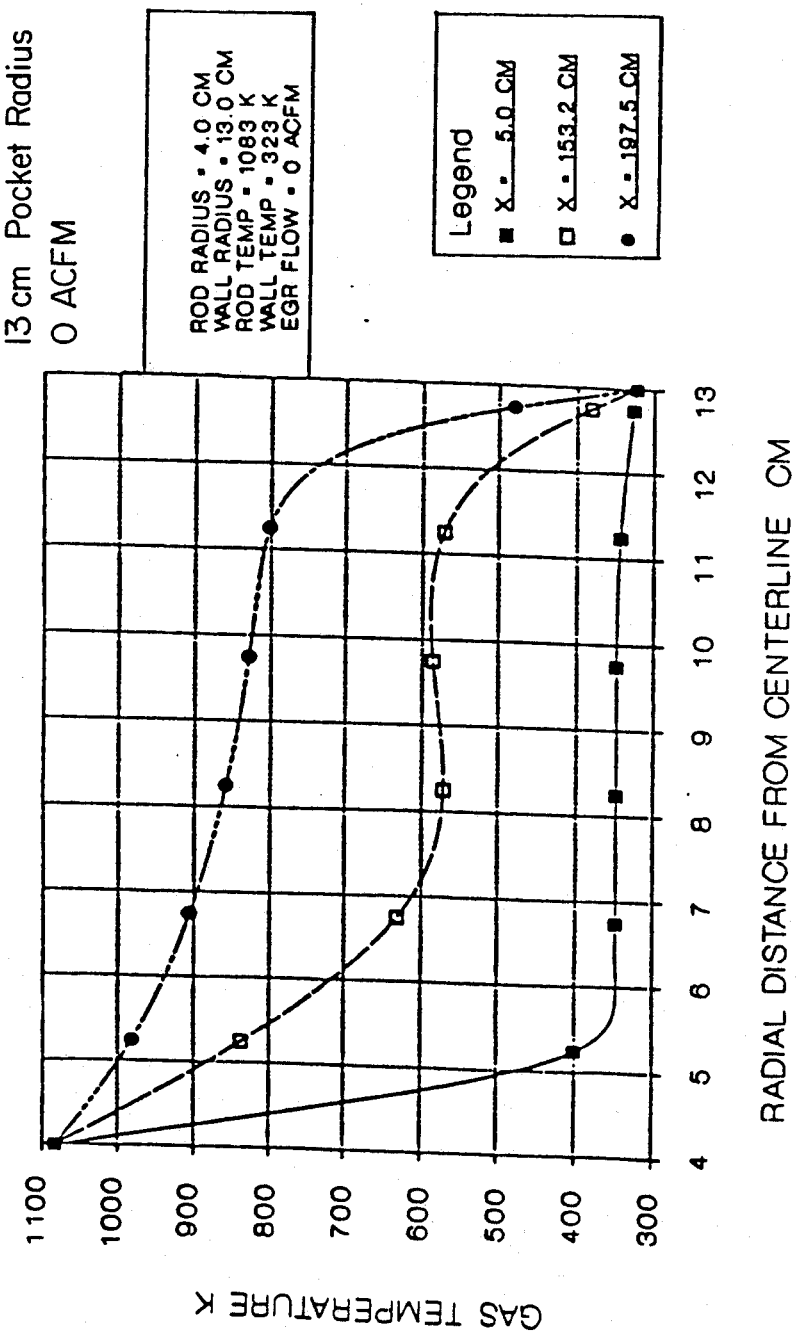

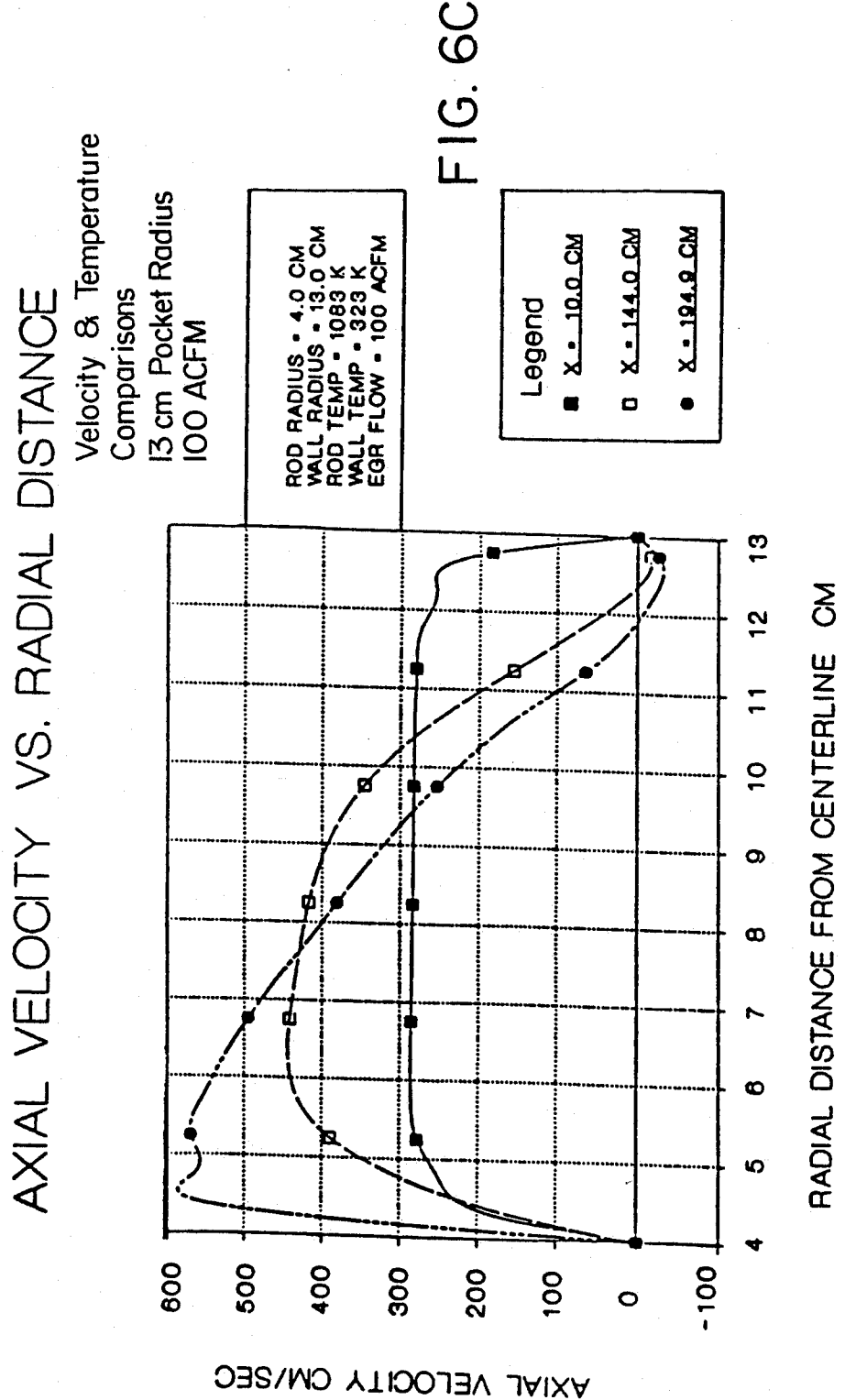

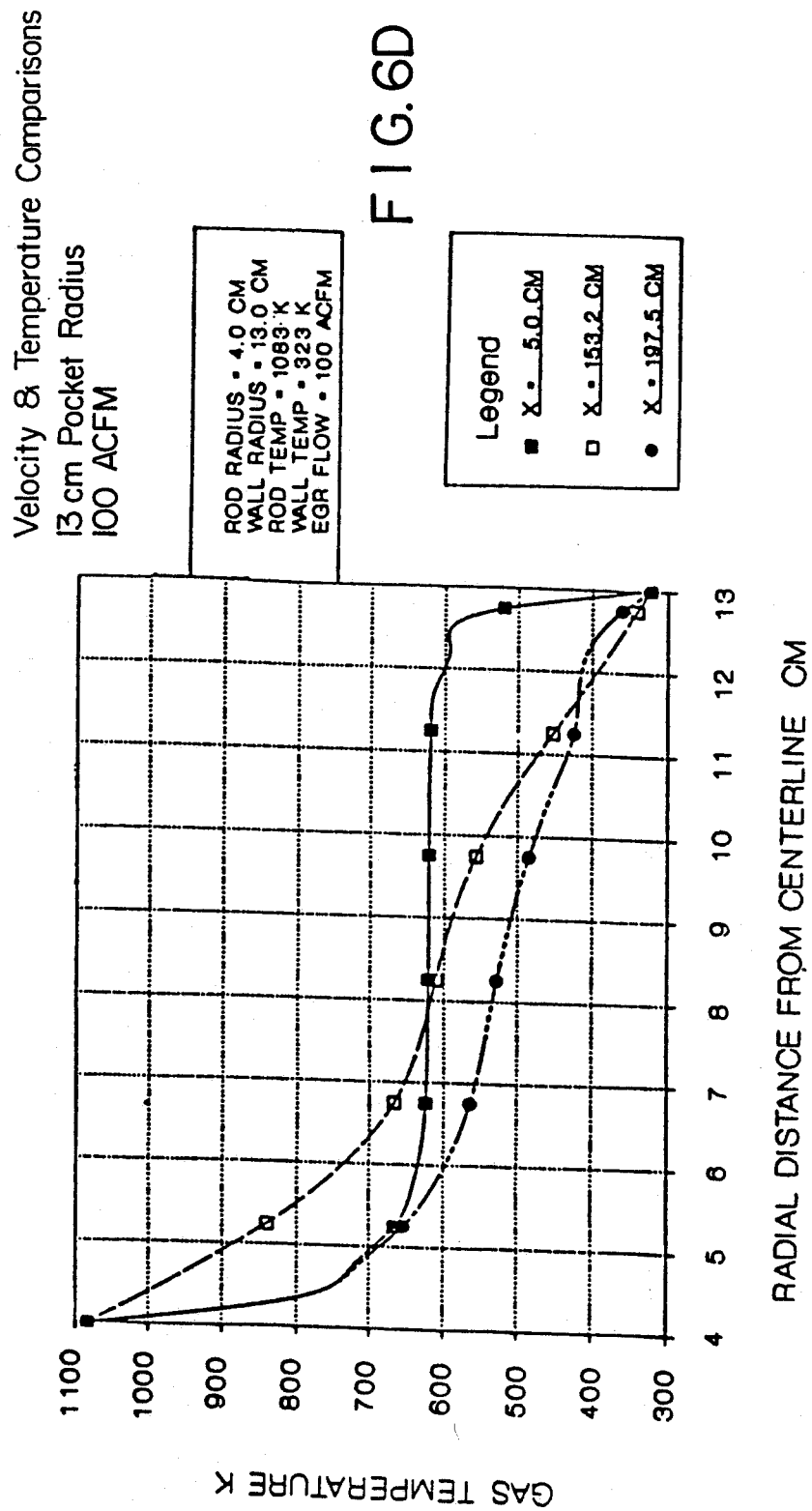

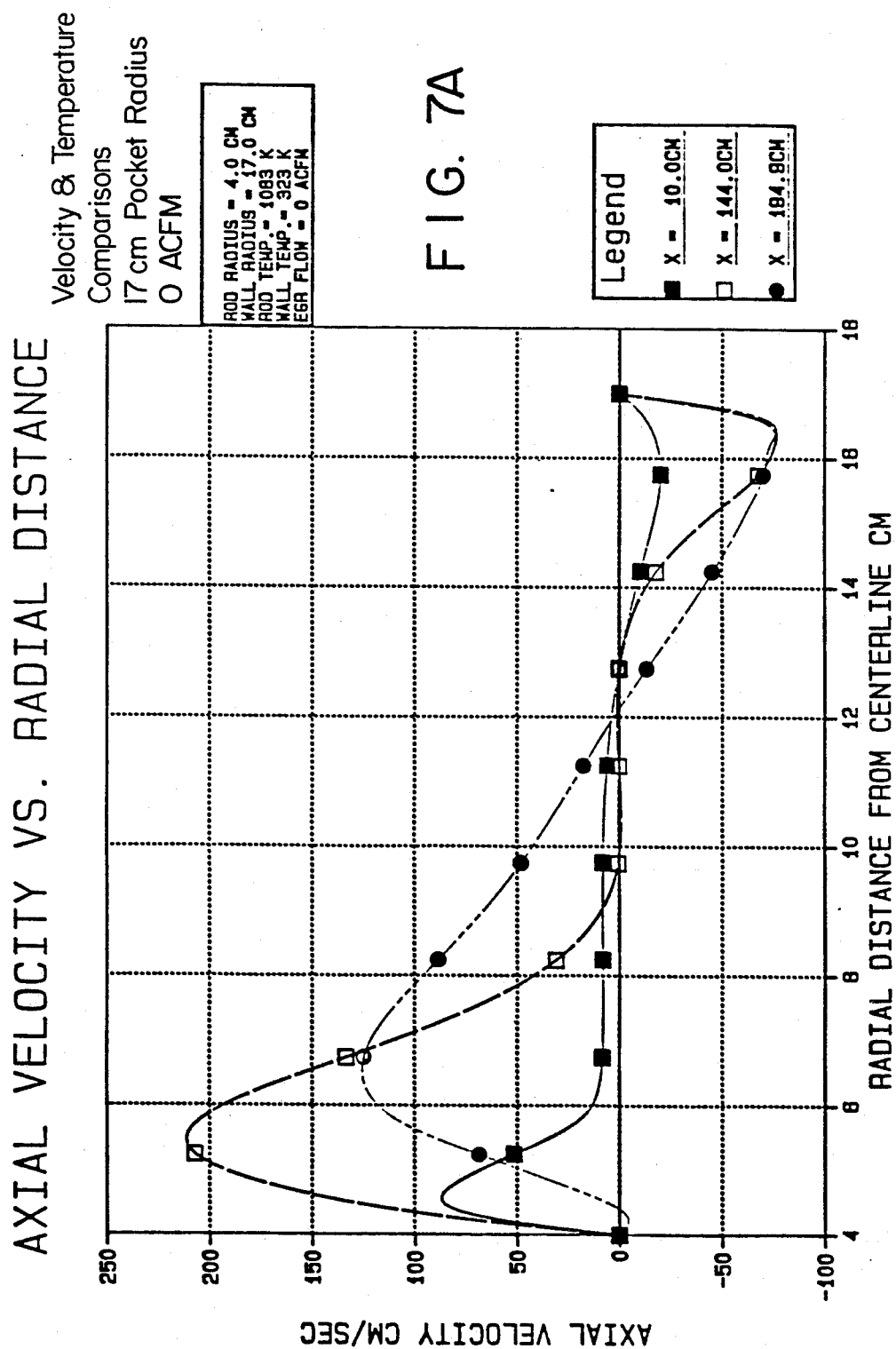

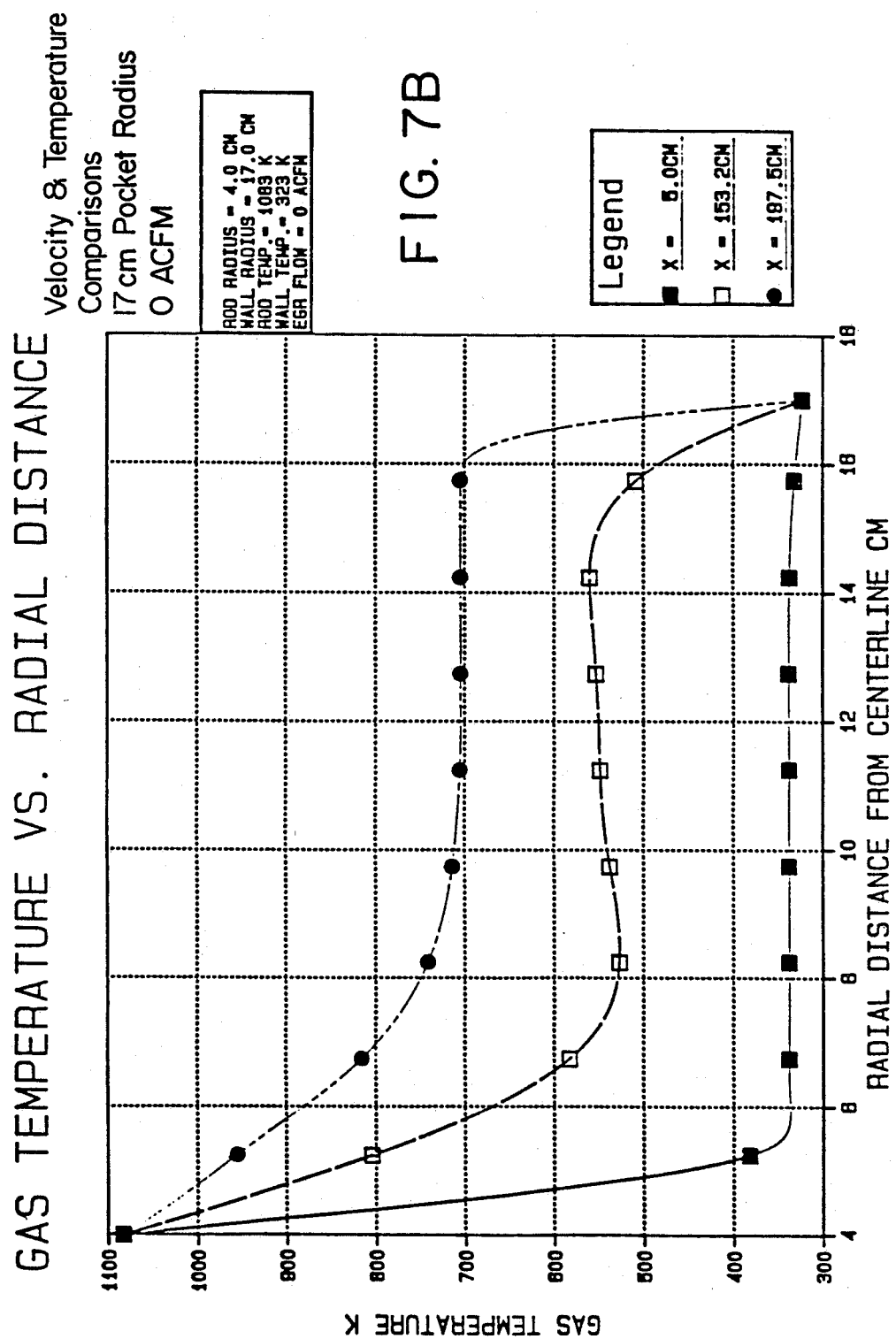

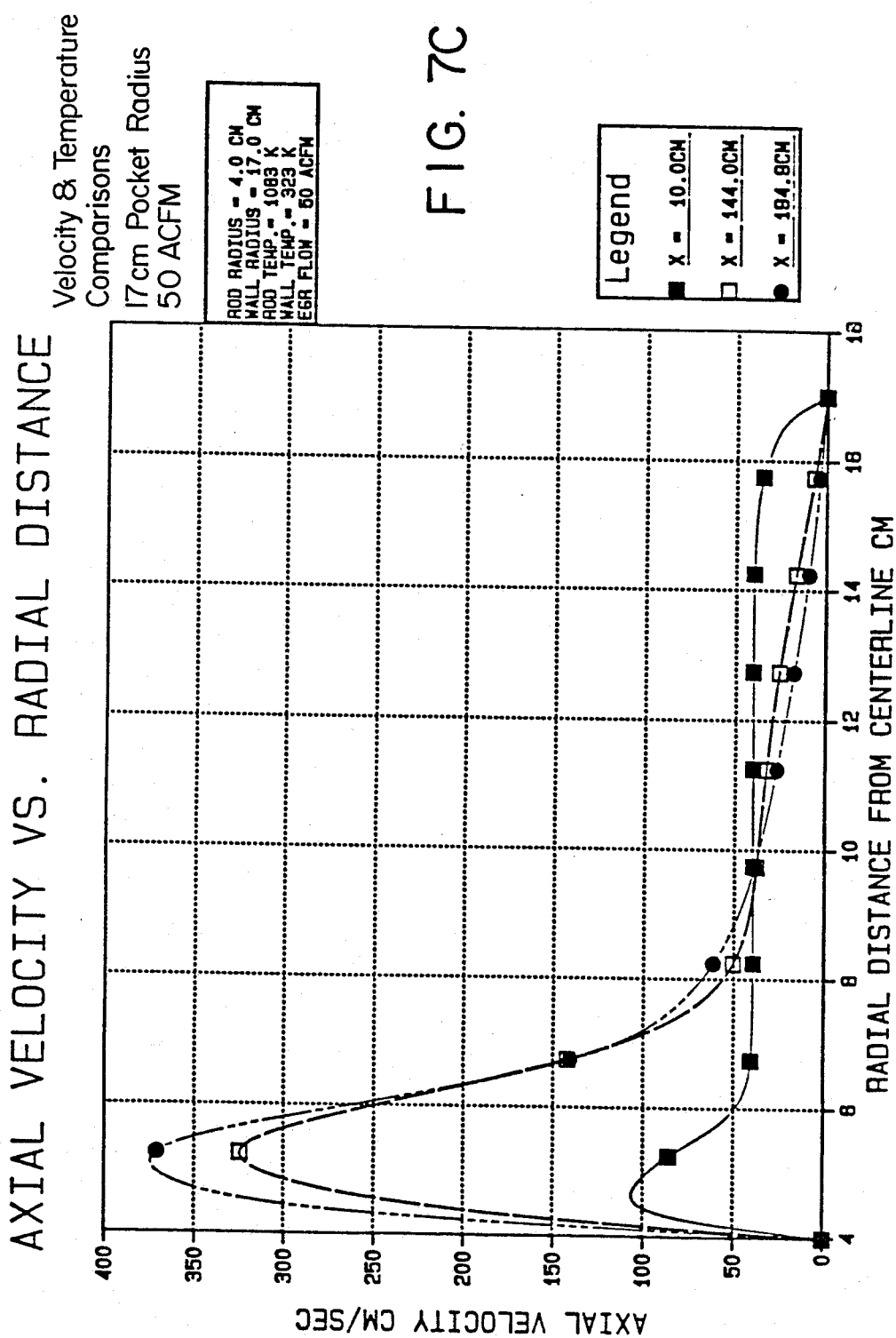

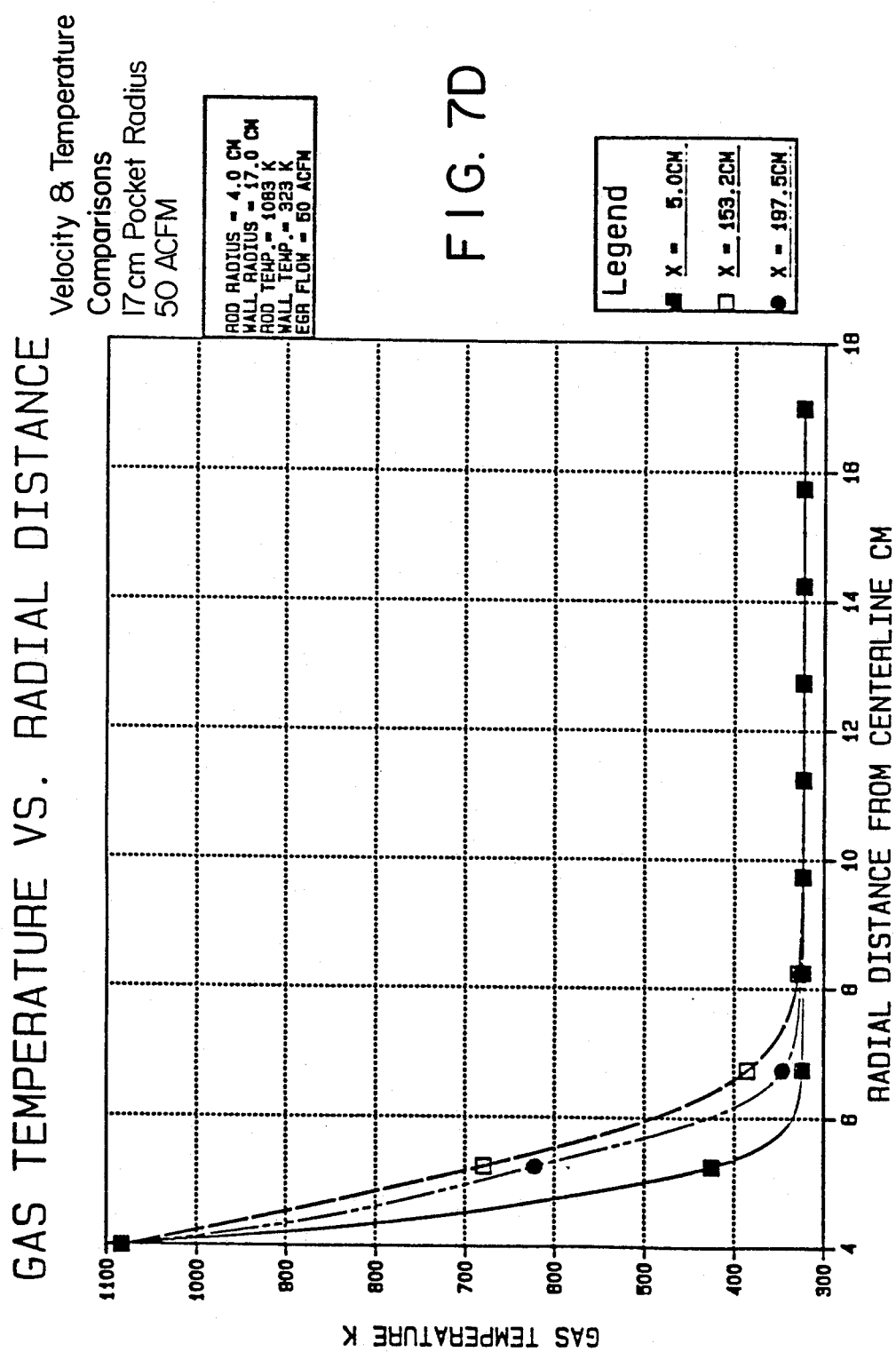

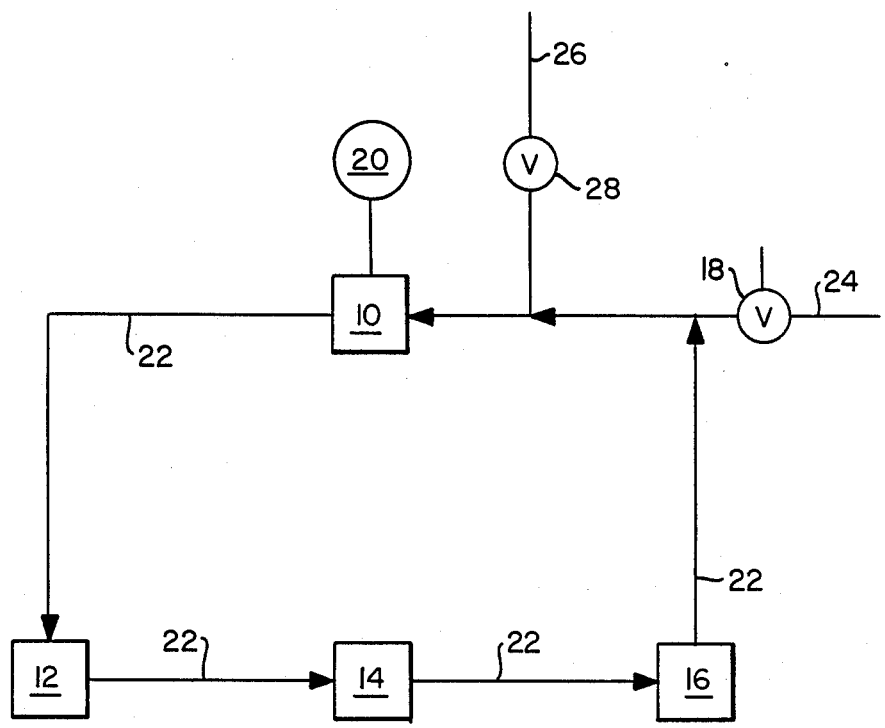
F I G. 8

PROCESS FOR THE PRODUCTION OF ULTRA HIGH PURITY POLYCRYSTALLINE SILICON

BACKGROUND OF THE INVENTION

1. Field of the Invention

This invention pertains to the production of ultra high purity polycrystalline silicon by the pyrolysis of silane. More specifically, the present invention relates to an improved process for producing such ultra high purity polycrystalline silicon which process provides for a decrease in the amount of silicon powder production leading to an increase in production capacity and electrical power efficiency.

2. Discussion of Related Art

Polycrystalline rods are primarily used as precursors for making single crystal rods for the semiconductor industry by either the float zone melting process or by the Czochralski crystal pulling technique. These single crystal rods are then processed to form silicon wafers from which silicon chips are made.

Generally, polycrystalline rods are made by the pyrolytic decomposition of a gaseous silicon compound, such as silane or a chlorosilane on a rod-shaped, heated filament made preferably from a silicon seed rod or, alternatively, from a highmelting point metal having good electrical conductivity such as tungsten or tantalum. The principles of the design of present state-of-the-art reactors for the pyrolysis of silane and chlorosilanes are set forth in, for example, U.S. Pat. Nos. 3,147,141, 4,147,814, and 4,150,168. It is generally more desirable to prepare the polycrystalline silicon rods by silane pyrolysis so as to avoid the complications caused by the formation of chloride by-products when pyrolyzing chlorosilanes. However, the silane pyrolysis is not without its own difficulties as well.

The existing reactors for the production of polysilicon rods by the pyrolysis of silane are designed as closed vessels which totally contain the reactants within closely controlled confines. This is done to minimize the potential for contamination of the hot growing silicon rods. The emphasis has been to let the reactant gases come into contact with only cooled, non-contaminating surfaces, except for the hot growing silicon rods. Reactors for the pyrolysis of silane (as compared to chlorosilanes) are characterized by having extended internal surfaces which may have water-cooled jackets to assist in cooling the reactant gases. Reactors for the pyrolysis of chlorosilanes, however, usually rely only upon the cooling obtained by the walls of the containment vessel, as taught in U.S. Pat. No. 4,147,814.

The pyrolysis of silane to form silicon and hydrogen is performed in a reactor consisting of a series of electrically heated filaments, generally silicon rods, surrounded by water cooled surfaces. The process is started with the silicon rod at ambient temperature.

The polycrystalline silicon is produced by heterogeneous decomposition of the silane on the glowing hot silicon rod. The reaction deposits silicon on the surface of the rod and releases hydrogen gas which is removed by the natural thermal convective transport of the resulting silane/hydrogen mixture leaving the reactor. This natural thermal convection is created by the hydrogen being heated by the vertically mounted hot silicon rod causing it to rise at a modest velocity estimated at about 152.4 cm./second and then cooled at the adjacent cooled reactor walls as it flows downwardly at a reduced velocity.

The silane pyrolysis proceeds at a rate determined by its concentration and local temperature. Desirable formation of dense crystalline silicon occurs in a narrow thermal boundary layer immediately surrounding the hot silicon rod. Such boundary layers are discussed in Transport Phenomena by R. B. Bird, et al. pages 366-369, (John Wiley & Sons, Inc., N.Y. 1960). To the extent that the bulk gas temperature is high enough and the distance from the rod large enough to prevent deposition of the silicon onto the rod, a competing homogeneous silane decomposition reaction takes place wherein deleterious submicron silicon powder is formed. In practice, it is found that this formation increases with increasing rod diameter due primarily to the increasing hot surface area of the glowing rod which, in turn, raises the temperature within the reactor causing mor homogeneous decomposition to take place.

Much of the powder particles are deposited on the cold reactor walls by thermophoretic deposition. However, this is a very weak process; a typical particle will recirculate many times before depositing on a cold-surface. Consequently, the number of particles in the internal recirculating gas eventually builds up to intolerable levels. This is detrimental since particles in the heated boundary layer adsorb thermal radiation further increasing thermal boundary layer temperatures and thereby the bulk gas temperature which accelerates still further homogeneous decomposition. Some of this powder ultimately deposits directly onto the silicon rod or, alternatively, flakes of deposited powder fall from the reactor walls onto the product. This affects both the surface morphology of the rod and causes undesirable contamination of the silicon rod product due to the incompatible melting behavior of the powdered silicon during subsequent single crystal formation techniques. If the powder concentration is sufficiently high, the surface morphology and/or the processability of the resulting silicon rod deteriorates to the point where the product becomes totally unacceptable.

Accordingly, the formation of silicon powder by homogeneous decomposition effectively places an upper limit on the diameter of the rods that may be grown during any production run and/or their corresponding rate of growth although larger rods at a maximum rate of growth would clearly be more cost effective. Once the amount of powder deposited on the reactor walls is such that it appears imminent that it is about to flake off, the reaction must be stopped so as to prevent contamination. So too, while it is known that increasing the silane concentration within the reactor will effect a higher growth rate of the silicon rod, the concomitant increase in the production of silicon powder negates any advantage that such increased growth rate may have.

This limited capability of the reactors translates into low productivity per reactor, a large consumption of electrical power per reactor, a large consumption of electrical power per unit of production and a large capital investment per annual unit of capacity. While the fraction of silane decomposing homogeneously into fine powder (about 1.0%) is small compared to the fraction decomposing heterogeneously into useful product, it is clear that the formation of even this relatively small amount of powder is quite detrimental and necessitates a need for finding a way to improve reactor productivity and efficiency.

SUMMARY OF THE INVENTION

Applicants have discovered an improved process for the production of polycrystalline silicon by silane decomposition on a heated rod in a pyrolysis reactor which eliminates or substantially reduces many of the disadvantages and problems associated with the prior art polysilicon production techniques discussed above.

More particularly, Applicants have discovered a process and a means for carrying out such process which substantially increases both the production capacity and electrical efficiency of a pyrolysis reactor and, most importantly, reduces the amount of silicon powder being formed in the reactor at a given silane concentration within the reactor. By virtue of Applicants' invention, the following, and more, advantages are realized: (1) the tendency of silane to form powdered silicon is dramatically reduced; (2) substantially all of the powdered silicon that is still formed may be removed from the reactor; (3) the growth rate of heterogeneously decomposed silicon on the heated rod is increased; (4) excellent product surface morphology is obtained; and (5) improved electrical efficiency is obtained.

Applicants have determined that while a decrease in the bulk gas temperature of the gases within the reactor to a temperature below 400° C. (approximately the decomposition temperature of silane) would help decrease the amount of silicon powder formed by homogeneous decomposition, they have also discovered that an even more important variable for the reduction of such silicon powder is the rate of flow of the gases along the hot, growing silicon rod.

Most surprisingly and totally unexpectedly, however, Applicants have also discovered that the variable of the rate of flow of the gases along the silicon rod and its concomitant affect upon the formation of silicon powder is critically dependent upon the geometry of the reactor itself, and more specifically, upon the radius of the reaction enclosure surrounding the hot, growing silicon rod.

Thus, Applicants have found that all of the above-noted objectives and advantages can be obtained by recycling at least a portion of the reactor effluent back to the reactor, preferably at a relatively high rate of flow, by means of an external blower. Desirably, these effluent gases are first cooled and filtered prior to being returned to the reactor. Most importantly, however, in conjunction with such recycling, the reactor must be designed such that each respective silicon rod is substantially enclosed within an enclosure whose effective radius is within the range of from about 6 to about 23 centimeters.

In this manner, the thickness of the thermal boundary layer surrounding the silicon rod is desirably reduced which leads to an increase in the production of silicon metal on the rod by heterogenous decomposition of silane and a corresponding decrease in the homogeneous decomposition of the silane. Moreover, as a result of such recycling within such a pocket-type enclosure having an effective radius noted above, the temperature within the thermal boundary layer is substantially more uniform both axially and circumferentially along the length of the rod thereby producing rods having improved and more uniform morphology.

Still further, as yet additional benefits of the present invention, not only is the amount of silicon powder production reduced but powder that is, in fact, still produced may be removed from the reaction site as the effluent gases are being recycled. Moreover, these recycled gases may also concurrently be cooled. In contrast, existing pyrolysis reactors have limited ability to remove heat from the reaction gases and from the heat being radiated from the hot, growing silicon rod itself due to geometrical limitations of these reactors and, moreover, have no means for dealing with, much less, removing by-product fine silicon powder.

In particular, the improved process of the present invention in which the formation of silicon powder is reduced comprises:

(a) providing an elongated starter rod substantially in the center of a cooled enclosure which enclosure has a wall at an effective radius of about 6 cm. to about 23 cm. and an upper outlet and a lower inlet;

(b) energizing the starter rod while introducing silane into the cooled enclosure, said starter rod being maintained at a temperature sufficient to effect silicon decomposition and deposition thereon and forming a thermal boundary layer around the periphery of said rod and produce by homogeneous decomposition silicon powder, said silane being provided at a rate sufficient to maintain the silane concentration in the cooled enclosure in an amount of at least about 0.5 mole percent; and (c) continuing step (b) for a time sufficient to grow a silicon rod having a diameter no greater than about 80 to 90 percent of the diameter of the enclosure, and while growing said rod:

(i) maintaining the wall of the enclosure at a temperature below about 100° C., (ii) removing at least a portion of an effluent comprised of unreacted silane, silicon powder and by-product hydrogen from the upper outlet of the enclosure, (iii) recycling the effluent at a rate of at least about 50,000 cubic cm/min. to the lower inlet of the enclosure.

Advantageously, the recycle rate back to the reaction enclosure is such that a substantial amount of silicon powder within the reactor is entrained and removed with the exiting effluent. Preferably, the recycled effluent is also filtered to remove substantially all of the silicon powder therefrom and/or cooled to a temperature less than 300° C. prior to being recycled into the reaction enclosure.

Exhaust gases withdrawn from the reactor by an external blower, and then preferably filtered and cooled, and forced back into the reactor at preferably a high rate of flow provides independent control of process heat transfer and removes silicon powder which heretofore has limited the surface quality and growth rate of the polysilicon rod product. The increased gas flow minimizes the deposition of powder on the wall and removes it to the filter. Increased gas circulation also provides for more uniform silane concentration along the length of the rod, both axially and circumferentially, for more uniform product quality as well. Most importantly, this increased gas flow, in conjunction with the utilization of a pocket-type enclosure for the silicon rod having a definitive radial dimension, actually reduces the amount of powder formaton.

So too, incorporating additional heat exchange area in the recirculation loop has taken the geometric constraints out of the reactor. It is now possible to have the bulk gas within the reactor be maintained at a temperature which is less than 400° C. so as to further help prevent homogeneous decomposition of the silane by means of this external cooling of the recycled gases.

Less powder production and the ability to remove powder from the reactor allows for longer production runs which in turn results in larger diameter rods and/or increased rate of growth for a fixed rod diameter. Moreover, more silane can now be introduced into the reactor which increases the concentration gradient and improves the growth rate of deposited silicon onto the rod. This improvement in the overall reaction rate offers the further advantage of reducing the overall electrical power consumption since more product is produced in a give length of time.

The prior art shows absolutely no appreciation or recognition of Applicants' discovery as to the relationship of gas flow along the axis of the silicon rod and the effective radius of the enclosure within which the rod is positioned as being a function of the amount of homogeneous silicon powder that is formed.

Thus, in Canadian Patent No. 728,584, the objective of the invention disclosed therein is to decrease the amount of silane powder production. This objective is accomplished by mixing a portion of the hydrogen produced as a result of the silane decomposition with the incoming silane while the silane is still at a temperature below its decomposition point and while the silane input to the reactor is adjusted so as to produce a molar concentration of silane within the reaction zone sufficiently low to prevent homogeneous decomposition.

As one embodiment of the Canadian invention, a portion of the hydrogen gas leaving the reactor as effluent is recycled with the use of a pump which is then mixed with the incoming silane. No mention is made that the amount of powder formed within the reaction site is a function of the radius of the reactor enclosure. Of course, in contrast to the Canadian disclosure in which the amount of silane concentration is reduced, in the present invention, the silane concentration is actually increased so as to correspondingly increase the rate of silicon metal production on the rod.

In Japanese published Patent Application No. SHO 42-17395, an invention is disclosed which allegedly reduces homogeneous decomposition and which also allegedly increases the silicon production rate. The process essentially involves a recycle of the exhaust gases leaving the pyrolysis reactor by means of an external blower wherein the gases are filtered prior to being reintroduced into the reactor. As in the Canadian patent discussed above, this Japanese Application also provides absolutely no suggestion that the radius of the enclosure in which each silicon rod is positioned has any effect upon the formation of undesirable silicon powder, much less, what radius should be employed in order to have the optimum reduction of the homogenous silane decomposition reaction.

The present invention has thus been able to eliminate the limitations and disadvantages associated with conventional silane pyrolysis reactors in a manner which is simple and economical resulting in both improved production capability and product quality.

BRIEF DESCRIPTION OF THE DRAWINGS

FIGS. 4a–4d show a series of graphs for a 7 cm. enclosure radius at no recycle and 50 cubic feet/minute ($1.4 \times 10^6$ cubic cm./minute) recycle using a silicon rod of 4 cm. showing axial velocity versus radial distance at three points along the rod, i.e., 10.0 cm., 144.0 cm. and 194.9 cm. from the bottom of the rod, and gas temperature versus radial distance also at three points along the rod, i.e., 5.0 cm., 153.2 cm. and 197.5 cm. from the bottom of the rod, where the rod temperature is set at 810° C. and the wall temperature is at 50° C.

FIGS. 5a–5d are similar to FIG. 4 except that a reaction enclosure having a 13 cm. radius is employed.

FIGS. 6a–6d is similar to FIG. 5 except that the recycled gases were not externally cooled.

FIGS. 7a–7d are essentially similar to FIGS. 4 and 5 with the only exception being that a 17 cm. radius enclosure is employed.

FIG. 8 is a schematic box diagram of how the conditions within the reaction enclosure zone may be obtained.

DETAILED DESCRIPTION OF THE INVENTION

One of the most important aspects of the present invention is Applicants' recognition and appreciation that the mere recycle of the effluent gases into the pyrolysis reactor, regardless of the amount of such recycle flow, is in and of itself not enough to cause a decrease in homogeneous powder formation—such recycle must be carried out in conjunction with a specific reaction zone diameter. Operating a recycle stream without any consideration given to the diameter of the reaction zone enclosure may very well entrain silicon powder thus enabling the removal of such powder in an external filtratinn step, but does substantially nothing to reduce the amount of silicon powder that is being formed within the reactor. Indeed, if the radius of the enclosure is too large or too small, the effect of recycle upon the reduction of powder formation is negligible.

Figure 1:
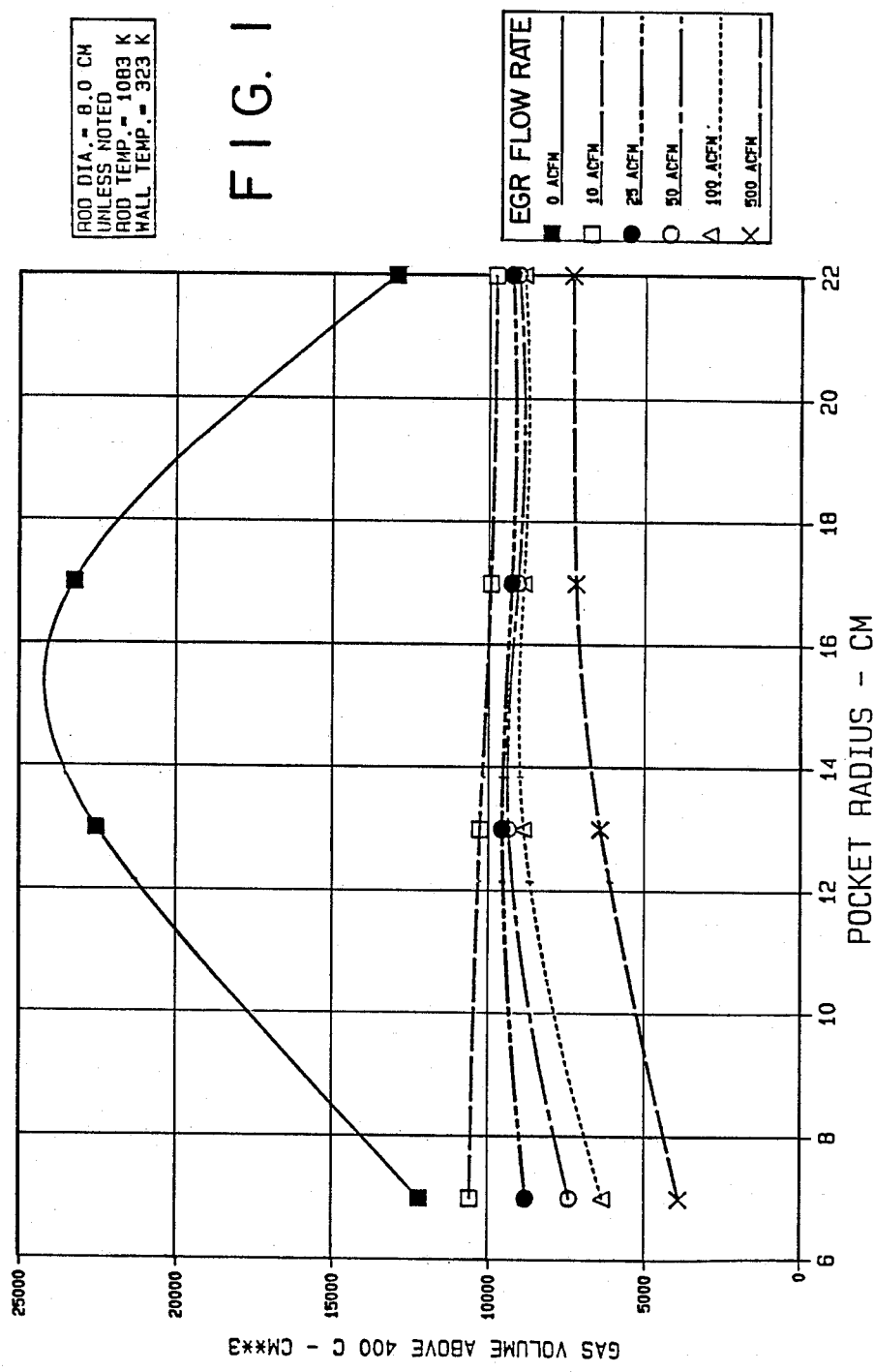
FIG. 1 is a graph showing the amount of gases within the pocket-type reaction enclosure which has a temperature greater than 400° C. (the approximate homogeneous decomposition temperature of silane), which effectively indicates silicon powder production, as a function of pocket radius for varying exhaust gas recirculation ("EGR") rates for a silicon rod having a diameter of 8 cm.
Figure 2:
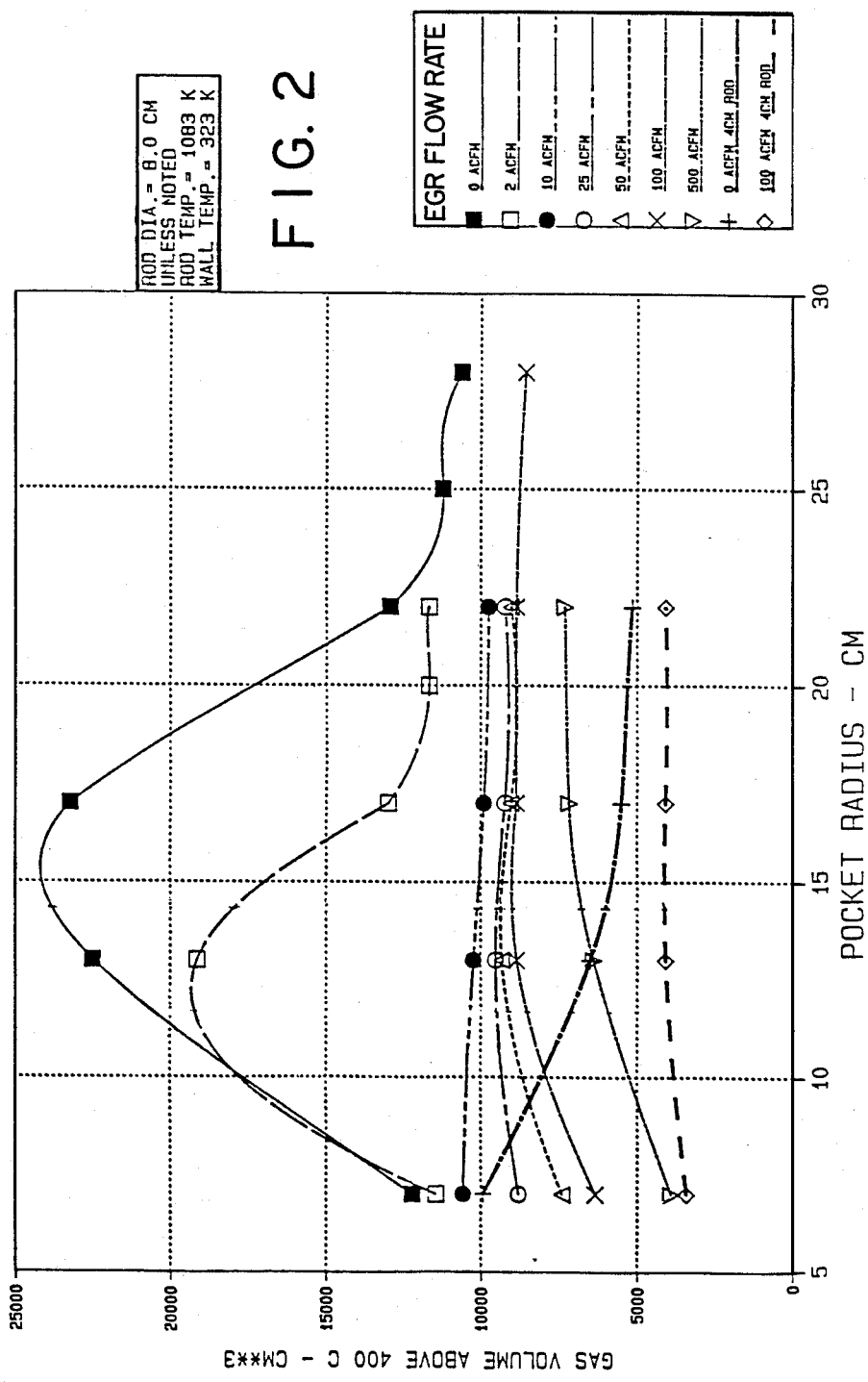
FIG. 2 is a graph similar to FIG. 1 which contains additional curves for a 4 cm. rod at no recycle and at a recycle rate of 100 cubic feet/minute ($2.8 \times 10^6$ cubic cm./minute).

This unique and surprising effect is clearly demonstrated in FIGS. 1–7. Referring to FIGS. 1 and 2, for example, these graphs set forth a number of curves in which the volume of gas having a temperature above 400° C. is plotted against the radius of the enclosure in which an 8 cm. rod is positioned, which curves represent different recycle rates including no recycle (curve labeled "0 ACFM"). It is noted that the coordinate of gas volume above 400° C. provides an indication as to the amount of silicon powder formation inasmuch as the temperature for homogeneous decomposition is about 400° C. and any gas which has a temperature less than this decomposition temperature will not be able to form the undesirable silicon powder.

In FIG. 2, in addition to the curves that are set forth in FIG. 1, a "2 ACFM" recycle flow rate curve has also been added and two curves representing a rod of 4 cm. are drawn at zero recycle rate and at 100 ACFM recycle rate, respectively, where "ACFM" designates actual cubic feet per minute of gas flow at the conditions stated.

From these graphs, it is strikingly clear how the radius of the enclosure is critically important in reducing the amount of powder formation.

Thus, from FIG. 1, it is seen that without any recycle being present, a bell-shaped curve is formed as the radius of the reaction pocket ranges from about 7 cm. to about 22 cm., with a 15 cm. radius producing the most powder. Even without any recycle at all, if the radius of the enclosure were made to be less than about 6 cm. or greater than about 25 cm., the amount of powder formed would significantly be reduced.

More particularly, as can be seen more clearly from FIG. 2, the 0 ACFM curve representing no recycle at all will eventually substantially approach all of the recycle curves as the radius of the enclosure either increases beyond 25 cm. or decreases less than about 5 cm. Recycle of the effluent exhaust gases, regardless of how high the recycle rate of flow, will essentially have no effect upon the formation of powdered silicon at these radii.

Hence, a typical bell-shaped silane pyrolysis reactor is employed which does not utilize separate and individual pockets or enclosures for each silicon rod that is being grown therein, in which the effective radius of such a reactor system is well above 25 cm., typically about 30 cm. to 300 cm., or greater, in radius, recycle of the effluent exhaust gases in such a reactor would have essentially no effect upon powder formation.

Without wishing to be bound by theory, it is believed that the reason why recycle of the effluent exhaust gases has no effect upon powder formation in the operation of reactors having a relatively very small reaction zone radius or, alternatively, a very large reaction zone radius, is due to the interaction of two physical phenomena that are occurring within the reaction zone, namely, the effects of natural convection and the effects of cooling surface area for absorbing radiant heat energy.

Natural convection is caused by the presence of the hot silicon rod and the relatively cold reaction walls. Those gases present in the reaction zone which are close to the rod will be heated and will naturally rise. As these heated gases contact the cooler walls of the reactor, they are cooled and then flow downwardly. As natural convection increases, more cooling of the gases takes place, resulting in less powder formation.

Consequently, in a reactor having an enclosure surrounding a silicon rod which enclosure has a relatively small radius, the amount of natural convection occurring due to the close proximity of the heated silicon rod and the cold reactor walls is substantially high resulting in the gases being kept at a low enough temperature to help reduce the amount of powder formation. It will be appreciated, however, that with such enclosures having small radii, say, less than about 5 cm., the amount of cooling surface area is very small and the primary cooling effect for the gases is facilitated by the high natural convection.

On the other hand, however, with reactor enclosures having a relatively large radius, say, greater than about 25 cm., the corresponding cooling surface area of the reactor walls becomes so large that it effectively acts as an excellent heat sink being able to absorb the radiant energy of the hot silicon rod and the heated gases to such an extent that powder formation is also substantially reduced. In this case though, there is much less natural convection due to the relatively larger distance between the hot rod and the cold reactor walls thereby making the effect of radiant heat transfer by the large surface area of the reactor walls the primary cooling mechanism in the reactor.

It is believed that if a reactor is utilized in which the reaction zone enclosure surrounding the heated silicon rod is not either very small or very large, the beneficial effects of natural convection and cooling transfer area are at their lowest resulting in the most powder formation. Indeed, this is evidenced by the peak in the bell-shaped curves of FIGS. 1 and 2, respectively, at pocket radius in the range of from about 13 to 17 cm.

From the above discussion as well as from FIGS. 1 and 2, it should now be readily apparent that the utilization of effluent exhaust gas recycle is effective for the reduction of powder formation only in reaction enclosures having a specific radius, particularly, a radius in which the advantageous effects of natural convection and cooling transfer area are substantially low. More specifically, the reaction zone enclosure best suited for the utilization of exhaust gas recycle in order to reduce powder formation are those having a radius in the range of about 6 to about 23 cm., preferably from about 6 to about 15 cm. Advantageously, the selection of a particular radius for the pocket-type enclosure will be influenced by the diameter of the silicon rod that is to be grown therein wherein the final rod diameter will be no greater than 80 to 90%, and preferably no greater than 85% of the diameter of the enclosure.

Referring to FIG. 2, a recycle rate of as little as 2 ACFM ($5.6 \times 10^4$ cubic cm./minute) in a reaction enclosure having a radius of about 19 cm. is seen to be able to actually reduce the volume of gas having a temperature of above 400° C. from about 19,000 cm.$^3$ to less than about 12,000 cm.$^3$, a reduction of about 37% which represents a very significant amount of silicon powder reduction. The use of a 2 ACFM recycle or, for that matter, even a 500 ACFM ($1.4 \times 10^7$ cubic cm./minute) recycle in a reaction zone having an effective radius of greater than about 25 cm. would have substantially no effect upon powder reduction.

Again, referring to FIG. 2, particularly the curve representing a rod having a radius of 4 cm., it is noted that the 0 ACFM curve for this rod, the one representing no recycle, as well as the 100 ACFM curve for this 4 cm. rod, are lower on the plot due to the lower heating surface area of the smaller rods resulting in less gas having a temperature greater than 400° C., and are also shifted to the left due to the larger flow area available, i.e., the annular space between the rod and the walls of the enclosure, and higher cooling area to heating area ratios for a given pocket size.

Figure 3:
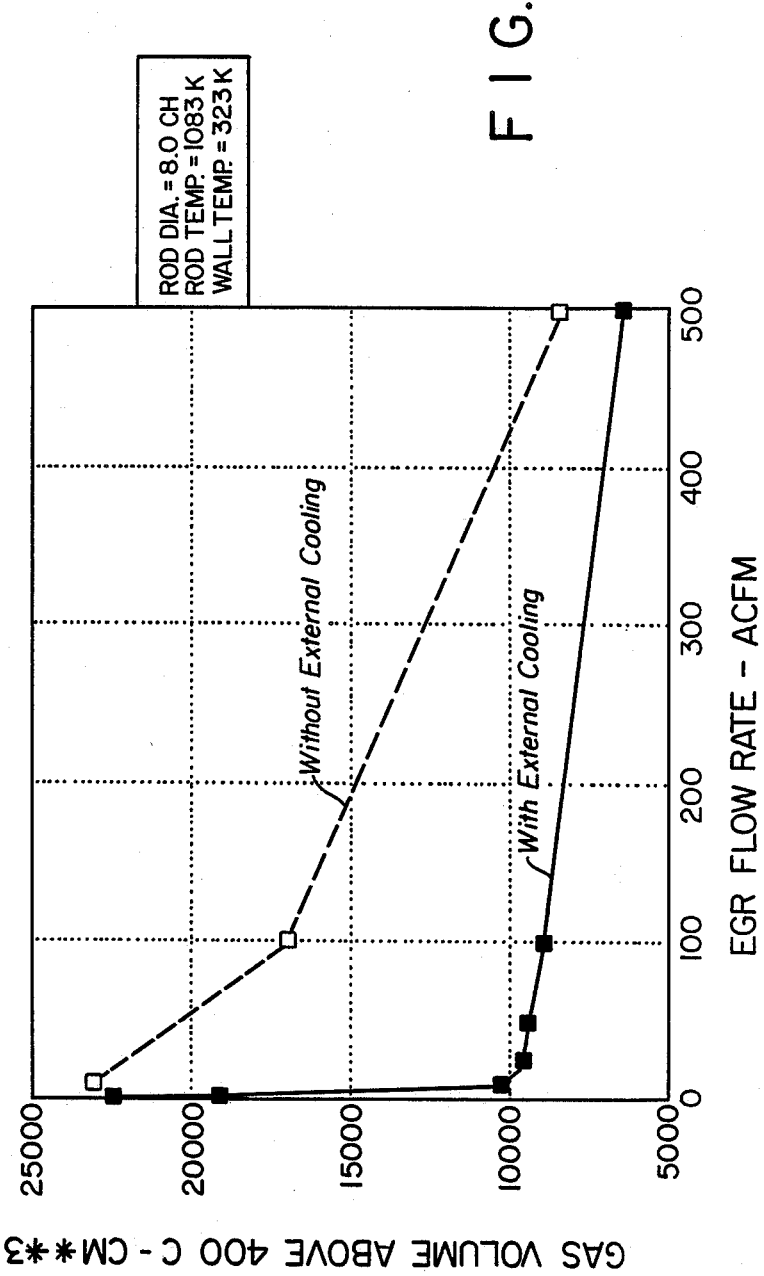
FIG. 3 is a graph showing the amount of gases within the pocket-type reaction enclosure which has a temperature greater than 400° C. as a function of exhaust gas recycle flow rate for recycle with and without external cooling for a silicon rod having a diameter of 8 cm.

From FIG. 3, it will be appreciated that the effect of recycling the exhaust gases when operating within the critical reaction zone radius range, such as the 13 cm. radius pocket shown, a reduction in powder formation will occur even without external cooling of the exhaust gases. Thus, with no recycle, the amount of gas having a temperature greater than 400° C. would be a constant of about 23,000 cm.$^3$ as shown in FIG. 3. With a recycle of about 100 ACFM ($2.8 \times 10^6$ cubic cm./minute), about a 30 percent reduction of powder formation is realized wherein the amount of gas now having a temperature greater than 400° C. is reduced to 16,000 cm.$^3$. This substantial reduction in powder formation occurs even without external cooling. When the recycle flow rate is further increased to about 500 ACFM, there is about a 63 percent decrease in powder formation in which the amount of gas having a temperature greater than 400°

C. is reduced from about 19,000 cm.$^3$ to about 8,500 cm.$^3$, without external cooling of the exhaust gases.

When external cooling is carried out upon the recycled exhaust gases, which is a preferred embodiment of the present invention, the amount of reduction in powder formation is even more striking, as is clearly seen from FIG. 3.

The reduction in powder formation caused by the external cooling of the recycled exhaust gases, can be explained simply by the fact that a reduction in the bulk gas temperature of the recycled effluent has occurred. However, the reduction of the gas temperature within the reaction zone resulting in reduced powder formation in which there is no external cooling of the recycled effluent gases is caused by a totally different effect, namely, the flow effects of the recycled gases past the heated silicon rod.

Again, without wishing to be bound by theory, it is believed that the increased flow of gases along the axial length of the heated silicon rod causes a reduction in the thickness of the thermal boundary layer. Such a reduction in the thermal boundary layer facilitates an increase in the desirable heterogeneous decomposition reaction taking place. Accordingly, more of the silane that is introduced into the reactor is converted by means of heterogeneous decomposition to silicon metal onto the silicon rod and, therefore, less of the silane is available for the undesirable homogeneous reaction. This effectively results in a decrease in powder formation.

So too, not only is there is a decrease in the thickness of the thermal boundary layer, but in addition thereto, the increased flow of gases along the heated silicon rod causes the thermal boundary layer to have a more uniform temperature along substantially the entire circumferential length of the rod. This advantageously produces more uniform silicon deposition onto the rod and also provides for improved morphology.

FIGS. 4, 5 and 7 compare velocity and temperature profiles in the reaction zone for recycled flows of 0 ACFM and 50 ACFM for pocket sizes of 7, 15 and 17 cm. radii, respectively. These plots show the dramatic effect of the recirculating flow on the reactor flow profile as well as the temperature patterns. Each curve in the respective plots represents a particular measurement taken along one of three different positions on the silicon rod where 0 cm. represents the very bottom of the rod. Thus, when comparing FIGS. 4b, 5b and 7b, with 4d, 5d and 7d, respectively, it can clearly be seen that the recycle of the exhaust gases causes the formation of a thermal boundary layer having a more uniform temperature along the length of the rod, which was discussed above.

FIG. 6 compares the velocity and temperature profiles for a 13 cm. pocket with 0 ACFM recycle flow and 100 ACFM recycle flow having no external cooling. In this case, it can be seen that the higher velocities and more uniform flow patterns lead to a more homogeneous and lower temperature profile even without cooling.

The pocket-type enclosure that has been referred to herein is a reaction zone which substantially surrounds a single starter rod, preferably a single crystal silicon starter rod, such as the pockets illustrated in FIG. 2 of U.S. Pat. No. 4,150,168 referred to above, the contents of which are incorporated herein by reference as if set out in full.

Such pockets generally are positioned around the inner perimeter of a bell-jar type reactor whose walls are cooled with a cooling medium. These pockets may generally be formed by inner partitions which are also cooled by a cooling medium. These pocket-type enclosures need not be comprised of one continuous wall. Indeed, as discussed in U.S. Pat. No. 4,150,168, part of the enclosure is formed by the inner wall of the bell-shaped reactor and the remaining part of such enclosure is formed by the inner partitions which are not contiguous to the reactor walls. These enclosures have a height which are tall enough to accommodate rods having a length generally in the range of about 150 cm. to 250 cm.

While any number of such pocket-type enclosures may be employed in the overall bell-jar reactor, only one silicon rod is utilized in any one such pocket enclosure, which rod is preferably positioned in the center of such pocket, with each enclosure having an upper outlet for the removal of effluent exhaust gases and a lower inlet for the introduction of the recycled gases.

While it is desirable to have these pocket-type enclosures as circular as possible so as to provide more uniformity within the reaction zone, such a geometric constraint is certainly not required. The enclosure can comprise any shape, for example, rectangular, square, oval, etc.. What is important is that the effective radius of this enclosure be in the range of from about 6 cm. to about 23 cm., and preferably from about 6 cm. to about 15 cm.

The walls of the enclosure are generally cooled by cooling water so as to provide a temperature in the walls as cold as possible, generally less than 100° C., and more preferably less than 50° C.

The silicon starter rods that are provided have a diameter which is generally less than 2 cm., and more preferably, less than 1 cm. These silicon single crystal starter rods are generally grown to a diameter which is about 80 to 90 percent of the overall enclosure diameter, and preferably are about 85% of the overall enclosure diameter. These rods are grown to final diameters which are as large as possible, as large as 15 cm., generally in the range of from about 8 cm. to 12 cm.

The amount of effluent exhaust gases that is recycled back to the pocket-type reaction enclosure is as least 50,000 cubic cm/min, preferably at least $2.5 \times 10^5$ cubic cm/min, and more preferably is in the range of from about $5 \times 10^4$ to about $15 \times 10^6$ cubic cm/minute, or higher. Although not required, as discussed earlier, the desirable effects obtained by the present invention are enhanced when the recycled gases are externally cooled. Preferably, the recycled gases are also filtered to remove entrained silicon powder.

Advantageously, the rate of recycle is such that any silicon powder that is produced in the reaction zone is entrained with the exiting effluent to be ultimately removed by an external removal means. Desirably, at least 25%, more preferably 50%, and most preferably 75% of the silicon powder within the reaction zone is entrained with the exiting effluent gases.

Referring now to FIG. 8, the process of the present invention may generally be carried out by means of a silane pyrolysis reactor 10, a blower 16 and a venting means 18. Preferably, a heat exchanger 12 and a filter 14 are also employed in the process of the present invention.

Silane pyrolysis reactor 10 is a conventional reactor and well known to those skilled in the art. Generally, such a reactor consists of a stainless steel double jacketed water cooled bell-jar and stainless steel water cooled interior partitions as discussed above, which form the required pocket-type enclosures. The partitions surround heated filaments which are made of silicon starter rods or some other suitable high melting metal upon which the polycrystalline silicon deposits as a result of the heterogeneous decomposition of the silane. The filaments are connected to and heated by an electrical power system 20 which maintains the filaments at a relatively constant temperature of between about 800° to 900° C. by adjusting the electrical current.

There is no criticallity in the specific sequence in which the exhaust gases are cooled and filtered or where the blower is positioned in the sequence. Thus, placing the filter first in the flow path would have the advantage of keeping the heat exchanger surfaces free of silicon powder. So too, placing the blower between the filter and the exchanger would provide a cooler recycle stream.

Desirably, however, the exhaust gases containing hydrogen, unreacted silane and silicon powder are passed from reactor 10 to heat exchanger 12 via conduit 22. In this manner, the exhaust gases are first cooled to a temperature as low as possible, generally less than 300° C., preferably in the range of about 50° to about 300° C., and more preferably to a temperature in the range of about 50° to about 100° C., such that the amount of contact that the gases have with various surfaces while they are still hot is minimized thereby reducing the chance for contamination. Moreover, by first cooling the gases, the bulk density of the gases is increased thereby reducing the size of the required filter and blower.

The heat exchanger serves two functions. Firstly, it reduces the temperature of the gases so that the possibility of contamination is reduced during subsequent processing within the recycle loop. Secondly, the temperature of the bulk gas is reduced to the extent that when it is recycled back to reactor 10, the bulk gas temperature within the reactor does not exceed 400° C. thereby facilitating the reduction of silicon powder formation.

Any conventional heat exchanger design may be employed provided that it is capable of having any silicon powder buildup be removed from its interior. Suitable heat exchangers include a typical shell-and-tube type exchanger, concentric shell exchangers, and the like. The tubes of these exchangers, through which the gases pass, are generally made a little larger than the heat transfer considerations would dictate in order to accommodate a powder buildup. This powder buildup can be removed from the exchanger either physically, such as by a reciprocating brush, or by a pulsating blast of a sweeping gas such as hydrogen, argon, or some other gas. Other conventional powder removal techniques may also be employed.

Of course, as with all of the equipment with which the exhaust gases come into contact, the material of construction of the heat exchanger must be such that it is suitable for use with these gases, particularly silane, and be non-contaminating and non-reactive. So too, all of the equipment must be of welded construction and be gas tight.

The hot exhaust gases are typically cooled with either air or water which is introduced to the heat exchanger at a temperature of about 30° to about 70° C.

Advantageously, once the gases have been cooled to the desired temperature, they are then passed through filter 12 wherein essentially all of the entrained silicon powder still present in the exhaust gases are removed.

Filter 12 is suitably any conventional filtering apparatus which is capable of effectively removing the silicon powder from the gas stream without causing any contamination. The filter should have an efficiency of at least about 99.5%. Applicable filters include an electrostatic precipitator, a metal mesh bag filter, a sintered metal candle-type filter, and the like.

Regardless of which filtering apparatus is used, it should have a nominal pore size of about 2 microns so as to be able to remove the silicon powder from the gas stream. Additionally, the filter should be able to accommodate the flow rate of the exhaust gases through the system.

Generally, the accumulated silicon powder is removed from the filtering apparatus by pulsing with a gas such as hydrogen to backblow the filter and shake the powder out to a collection hopper (not shown).

As noted earlier, the size of the filter will depend upon, among other things, its location in the recycle loop. If it is present after the heat exchanger, i.e., after the gases have been cooled, it will be smaller than if it were employed, in contrast, with hot exhaust gases coming directly from the reactor.

Preferably, after the exhaust gases have been cooled and filtered, they are then passed through blower 16 via conduit 22.

Blower 16 provides the driving force for doing at least two things. It provides the necessary pressure to overcome all of the pressure drops within the entire operating system, including the reactor, heat exchanger, filter, conduits, etc. Moreover, it provides a flow rate through the reactor which, if desired, can physically entrain silicon powder that may be produced therein and remove such entrained powder from the reactor with the exiting exhaust gases.

Any conventional blower may be used provided that it is hermetically sealed and made of a suitable material of construction as discussed above. Suitable blowers include a multistage centrifugal blower, a positive displacement blower or a Roots type blower.

Generally, Applicants have found that in order to entrain silicon powder that is being formed in the reactor and to promote the rate at which the heterogeneously formed silicon deposits on the silicon rod, i.e., the silicon rod growth rate, the exhaust gases should be recycled through the reactor at a rate greater than 20 m$^3$/hr per 1 kg/hr of polycrystalline silicon production. Preferably, the rate of recirculation is in the range of about 20 to 2,000 m$^3$/hr per 1 kg/hr of silicon production and more preferably in the range of about 300 to 1,200 m$^3$/hr per 1 kg/hr of silicon production.

The blower passes the exhaust gases past venting means 18 where a portion of the exhaust gases is allowed to be vented and leave the system. This is done in order to maintain the amount of gases flowing in the system relatively constant based on the amount of silane being fed into the system. Since one mole of silane decomposes to form two moles of hydrogen, it is understood that the amount of exhaust gases that is vented through venting means 18 and into conduit 24 is twice the molar amount of silane that is being fed into the system. Conduit 24 leads to a separation and recovery system (not shown) for separating and recovering silane and hydrogen.

Venting means 18 may comprise any suitable device for enabling the removal of a particular amount of exhaust gas from the recycle loop and may simply constitute a control valve.

The recycled effluent exhaust gases are then reintroduced into the reactor 10 via an appropriate gas distributor which evenly distributes the gases throughout the reactor. Preferably, the recycled gas is introduced at each polysilicon product rod such that the gases flow upwardly along and around the axial length of each rod, in a uniform and circumferential manner.

Fresh silane may be introduced at the conventional silane inlet ports of the reactor as discussed in the aforementioned U.S. Pat. No. 4,147,814, which are usually located adjacent each rod at the inner wall of the reactor along its vertical axis or, alternatively and more desirably, the silane may be added via line 26 past valve 28 directly into the recycle loop.

In operation, the process of the present invention is carried out by first filling the system with hydrogen at the startup of the process. Inasmuch as the surface area of the heated rod is low at the start of the process, the amount of silane that can initially be added is limited by the amount of available filament surface area at which decomposition can take place. In the beginning of the process, less recycle gas flow through the reactor and higher bulk temperatures can be tolerated since less silane is introduced with a concomitant less amount of powder forming. However, as the rod grows and more surface area becomes available on the rod, more silane is introduced which generally leads to more powder formation. The rate of flow of the recycled exhaust gases through the reactor and its respective bulk gas temperature are such that the temperature of the bulk gas leaving the reactor is never greater than 400° C.

It should be apparent to one skilled in the art that the combination of the rate of flow, the inlet temperature of the bulk gas, and the diameter of the growing silicon rod will determine the outlet temperature. Thus, by decreasing the rate of flow through the reactor for a given inlet temperature and silicon rod size, the gases are subjected to a longer residence time within the reactor thereby increasing the outlet temperature of the exhaust gases. Similarly, by introducing the recycled gases at a lower temperature at a given flow rate, the outlet temperature will also be reduced. The rate of flow is advantageously high enough so as to entrain silicon powder that is produced in the reactor. Depending upon what that minimum flow rate is, the inlet temperature is then adjusted accordingly so that the outlet temperature is no greater than 400° C., and preferably no greater than 300° C.

The flow rate of the exhaust gases through the reactor is generally limited by a morphology constraint. Thus, if the flow rate is too high past the silicon rods, particularly at the gas inlet end of the rod, the surface appearance of the product may be affected if the gases are not introduced in a uniform, circumferential manner along and around the axial length of the rods. However, this upper limit is generally much higher than is necessary to entrain a substantial portion of the silicon powder. Generally, the morphology of the silicon rod product obtained by the process of the present invention is desirably smooth.

After the startup phase, fresh silane is introduced into the reactor at a rate such that the silane concentration within the reactor is maintained at a constant level, generally at least about 0.5 mole %, preferably in the range of about 0.5 to 10 mole %, and more preferably in the range of 1.5 to 5 mole %. This corresponds to a silane feed rate per 1 kg/hr of silicon production of 1.15 to 1.5 kg/hr, preferably 1.15 to 1.35 kg/hr of silane. The amount of unreacted silane present in the exhaust gases generally is in the range of from about 1.5 to 3 mole %. Generally, the product yield of the present invention is over 90%.

The pressure within the reactor is kept constant and is usually in the range of atmospheric pressure to an absolute pressure of up to 10 bars. To keep the reactor pressure constant, excess exhaust gases are removed from the recycle loop.

By virtue of the present invention, growth rates of heterogeneous silicon on the heated rod are obtainable which are in the range of from about 5 to 15 microns/min, generally in the range of from 7 to 10 microns/min.

Moreover, as a result of the present invention, the power consumption for producing the polysilicon product is generally below 120 kwh/kg of product.

Having described the basic concept of this invention, the following Example is set forth to illustrate the same. It is not, however, to be construed as limiting the invention in any manner.

EXAMPLE

In a conventional silane pyrolysis reactor made of stainless steel with a double walled, watercooled belljar having two heated silicon rods, each enclosed in a pocket having a substantially circular configuration with an effective radius of 13 cm., silane gas was fed at an average rate of 2.9 liters/min. (silane concentration in the reactor being about 1.5 mole %) for a period of 230 hours. The silicon rods had an initial diameter of 7 mm and a length of 175 cm. After the 230 hours, the silicon rod had grown to a diameter of 85 mm and had gained 47,000 grams in mass. A total of 56,000 grams of silane had been fed and 9,500 KW of electrical power had been consumed in keeping the growing rods at the reaction temperature. The silicon rod surface was moderately rough.

The reactor described above was then operatively connected to an external circulation cooling and filtration loop containing a heat exchanger, a filter and a blower. The reactor was started at the same conditions described above, except that the blower provided a circulation rate of 1,586 liters/minute, i.e., 793 liters/minute per pocket. The gas inlet temperature was 60° C. and the outlet temperature was 150° C. The silane concentration within the reactor was about 3.0 mole %. The reaction conditions were continued until the rods grew to a diameter of 85 mm. representing a gain of 48,000 grams over a period of 132.4 hours. A total of 58,000 grams of silane had been fed and 6,652 KW of electrical power consumed to produce the 48,000 net grams of silicon. The amount of silicon powder collected in the filter was 440 grams. This represents a 70% increase in production capacity, and a 40% reduction in electrical power usage. The surface quality of the silicon rod was excellent with no evidence of powder inclusions.

What is claimed is:

1. A process for the formation of polysilicon crystal rods in which the formation of silicon powder is reduced comprising:
   (a) providing an elongated starter rod substantially in the center of a cooled enclosure which enclosure has a wall at an effective radius of from about 6 cm. to 23 cm. and an upper outlet and a lower inlet;
   (b) energizing the starter rod while introducing silane into the cooled enclosure, said starter rod being maintained at a temperature sufficient to effect silicon decomposition and deposition thereon and forming a thermal boundary layer around the periphery of said rod and produce by homogeneous decomposition silicon powder, said silane being provided at a rate sufficient to maintain the silane concentration in the cooled enclosure in an amount of at least about 0.5 mole percent; and (c) continuing step (b) for a time sufficient to grow a silicon rod having a diameter no greater than about 80 to 90% of the diameter of the enclosure, and while growing said rod:

(i) maintaining the wall of the enclosure at a temperature below about 100° C.;

(ii) removing at least a portion of an effluent comprised of unreacted silane, silicon powder and by-product hydrogen from the upper outlet of the enclosure; and (iii) recycling the effluent at a rate of at least about 50,000 cubic cm./min. to the lower inlet of the enclosure.

2. The process of claim 1, wherein the starter rod is comprised of silicon.

3. The process of claim 1, wherein the starter rod is a single crystal silicon rod.

4. The process of claim 1, wherein the starter rod has a diameter of less than 2 cm.

5. The process of claim 2, wherein the starter rod has a diameter of less than 1 cm.

6. The process of claim 1, wherein substantially all of the powder from the effluent is removed prior to being recycled to the enclosure.

7. The process of claim 1, wherein the effluent is cooled to a temperature less than 300° C. before being recycled to the enclosure.

8. The process of claim 1, wherein the effluent is cooled to a temperature in the range from about 50° to about 300° C. before being recycled to the enclosure.

9. The process of claim 8, wherein the effluent is cooled to a temperature in the range from about 50° to about 100° C. before being recycled to the enclosure.

10. The process of claim 1, wherein substantially all of the powder from the effluent is removed and the effluent is cooled to temperature of less than 300° C., prior to being recycled to the enclosure.

11. The process of claim 1, wherein the effective radius of the enclosure is from about 6 to about 15 cm.

12. The process of claim 1, wherein the starter rod is energized by passing an electric current through the rod.

13. The process of claim 1, wherein the silane concentration in the cooled enclosure is in the range of from about 0.5 to 10 mole percent.

14. The process of claim 13, wherein the silane concentration in the cooled enclosure is in the range of from about 1.5 to 5.0 mole percent.

15. The process of claim 1, wherein the portion of effluent is recycled into the enclosure at a rate sufficient to entrain at least about 25 percent of the silicon powder being formed within the enclosure and removing said powder from the enclosure through the outlet of the enclosure with the exiting effluent.

16. The process of claim 1, wherein the portion of effluent is recycled into the enclosure at a rate sufficient to entrain at least about 50 percent of the silicon powder being formed within the enclosure and removing said powder from the enclosure through the outlet of the enclosure with the exiting effluent.

17. The process of claim 1, wherein the portion of effluent is recycled into the enclosure at a rate sufficient to entrain at least about 75 percent of the silicon powder being formed within the enclosure and removing said powder from the enclosure through the outlet of the enclosure with the exiting effluent.

18. The process of claim 1, wherein the effluent is recycled at a rate of at least $2.5 \times 10^5$ cubic cm./min.

19. The process of claim 1, wherein the effluent is recycled at a rate of about $5 \times 10^4$ to about $15 \times 10^6$ cubic cm./min.

20. The process of claim 1, wherein the effluent is recycled at a rate sufficient to decrease the thickness of the thermal boundary layer.

21. The process of claim 1, wherein the effluent is recycled at a rate sufficient to provide uniform temperature within the thermal boundary a layer substantially along the entire axial length of the rod.

22. The process of claim 1, wherein the effluent is recycled at a rate greater than 20 m$^3$/hr per 1 kg/hr of silicon production.

23. The process of claim 22, wherein the effluent is recycled at a rater greater than 20 to 2,000 m$^3$/hr per 1 kg/hr of silicon production.

24. The process of claim 1, wherein the bulk temperature of the effluent leaving the enclosure through the outlet is less than 400° C.

25. The process of claim 24, wherein the bulk temperature of the effluent leaving the enclosure through the outlet is less than 300° C.

26. The process of claim 1, wherein the enclosure is at atmospheric pressure up to 10 bars of absolute pressure.

27. The process of claim 1, wherein the final rod diameter is at least 8 cm.

28. The process of claim 1, wherein the final rod diameter is at least 10 cm.

29. The process of claim 1, wherein the final rod diameter is at least 12 cm.

30. The process of claim 1, wherein the recycled effluent enters the lower inlet of the enclosure in a manner such that the effluent flows upwardly in a uniform and circumferential manner along and around the length of the silicon rod.

* * * * *